United States Patent
Kojima

(10) Patent No.: US 7,510,172 B2
(45) Date of Patent: Mar. 31, 2009

(54) MIXING ELEMENT AND STATIC FLUID MIXER USING SAME

(75) Inventor: Hisao Kojima, Kanagawa (JP)

(73) Assignee: Anemos Company Ltd., Tokyo (JP)

(*) Notice: Subject to any disclaimer, the term of this patent is extended or adjusted under 35 U.S.C. 154(b) by 568 days.

(21) Appl. No.: 11/276,340

(22) Filed: Feb. 24, 2006

(65) Prior Publication Data
US 2007/0205523 A1 Sep. 6, 2007

Related U.S. Application Data

(63) Continuation-in-part of application No. PCT/JP2004/001631, filed on Feb. 16, 2004.

(51) Int. Cl.
*B01F 3/04* (2006.01)
(52) U.S. Cl. .................. 261/79.2; 261/113; 96/296; 96/326; 366/339; 366/340
(58) Field of Classification Search ................ 261/79.1, 261/79.2, 94, 113; 96/296, 314, 320, 324, 96/326; 366/338, 339, 340, 341
See application file for complete search history.

(56) References Cited

U.S. PATENT DOCUMENTS

| | | | | |
|---|---|---|---|---|
| 2,317,101 A | * | 4/1943 | Lecky | 261/79.2 |
| 3,348,830 A | * | 10/1967 | Pearl et al. | 261/161 |
| 3,582,051 A | * | 6/1971 | Klein et al. | 261/79.2 |
| 4,466,741 A | | 8/1984 | Kojima | |
| 4,533,015 A | | 8/1985 | Kojima | |
| 4,747,697 A | | 5/1988 | Kojima | |
| 4,878,925 A | | 11/1989 | Kojima | |
| 5,104,233 A | | 4/1992 | Kojima | |
| 5,605,400 A | | 2/1997 | Kojima | |
| 5,945,039 A | | 8/1999 | Kojima | |

(Continued)

FOREIGN PATENT DOCUMENTS

EP   0 678 329   9/1998

(Continued)

OTHER PUBLICATIONS

S.J. Chen et al.; Static Mixing Handbook; Chemical Research Institute, Jun. 1973.

(Continued)

*Primary Examiner*—Scott Bushey
(74) *Attorney, Agent, or Firm*—Sonnenschein Nath & Rosenthal LLP

(57) ABSTRACT

A mixing element, which is produced at low cost, has high mixture agitation effectiveness, and is easily made large, and a static fluid mixer using the mixing element are provided. Further, a gas-liquid treatment apparatus with high treatment ability is provided. A mixing element 1 includes: a cylindrical passage tube 2 trough which fluid flows; a plurality of spiral rightward rotation type first blades 3 formed of a perforated object, which are provided in the passage tube 2; a first inner cylindrical tube 5 shaped like a cylinder and disposed inside the blades 3; a plurality of spiral rightward rotation type blades 6 provided in the inner cylindrical tube 5; and an opening 9 formed in the axial center portion of the blades 6. A static fluid mixer is formed by using at least one mixing, element 1 mentioned above.

24 Claims, 27 Drawing Sheets

U.S. PATENT DOCUMENTS

| | | |
|---|---|---|
| 6,209,856 B1 | 4/2001 | Kojima |
| 6,227,524 B1 * | 5/2001 | Kiselev et al. .............. 261/79.2 |
| 6,283,459 B1 | 9/2001 | Kojima |
| 6,431,528 B1 | 8/2002 | Kojima |
| 2008/0169576 A1 * | 7/2008 | Kojima ....................... 261/116 |

FOREIGN PATENT DOCUMENTS

| | | |
|---|---|---|
| JP | 58-128134 | 7/1983 |
| JP | 62-60793 | 4/1987 |
| JP | 05-168882 | 7/1993 |
| JP | 07-080279 | 3/1995 |
| JP | 07-088319 | 4/1995 |
| JP | 07-284642 | 10/1995 |
| JP | 10-339396 | 12/1998 |
| JP | 11-304067 | 11/1999 |
| JP | 2001-170476 | 6/2001 |
| JP | 2001-187313 | 7/2001 |

OTHER PUBLICATIONS

Kiichrio Matsumura et al; Static Mixer—Fundamentals and Applications; Nikkan Kogyo Shimbun, Ltd; Sep. 30, 1981.

International Search Report dated Apr. 27, 2004.

* cited by examiner

MIXING ELEMENT AND STATIC FLUID MIXER USING SAME

RELATED APPLICATION DATA

The present application is a continuation-in-part of International Patent Application PCT/JP2004/01631 filed Feb. 16, 2004, which is fully incorporated herein by reference to the extent permitted by law.

BACKGROUND OF THE INVENTION

1. Field of the Invention

The present invention relates to an improvement on a mixing element used in a static fluid mixer which mixes one or more kinds of fluids (liquids, gases, solids and mixtures of these) without a mechanically movable part, and also on a static fluid mixer using the mixing element.

Static fluid mixers of this kind are used in mixture, agitation, extraction, distillation, gas absorption, solution, stripping, emulsification, heat exchange, dispersion, particulate mixture and the like.

Further, static fluid mixers are used in many fields such as chemical industry, paper and pulp industry petrochemical industry, pharmaceutical industry, semiconductor industry, optical fiber manufacturing industry, energy industry and environment-related industry.

For example, a static fluid mixer is used as packing in an exhaust gas treatment apparatus of an absorption column method in which harmful substances in exhaust gas such as Hcl, $NH_3$, $NO_x$, $SO_x$, $Sicl_4$, $SiHcl_3$, $SiF_4$, $CO_2$, Hg and dioxin undergo gas-liquid contact, in a dust removing apparatus which traps and collects $SiO_2$, microparticles such as soot and dust in exhaust gas, and in a distillation apparatus. Further, a static fluid mixer is used as an apparatus for removing and collecting organic chlorine-based chemical compounds, ammonia ($NH_4+$) and the like, in which discharged water undergoes stripping treatment and as an aeration treatment apparatus.

2. Description of the Related Art

Patent application for a mixing element and a static fluid mixer using the mixing element of related art have been made by the inventor, in which two right-twisted/left-twisted spiral blades are disposed in a passage tube. This static fluid mixer has an opening at its central part, and edges of right-twisted and left-twisted blades are alternately disposed at right angles to each other with space portions in between. Further, the twisting angles of these blades are 90° and 180°. Further, the production method of this static fluid mixer includes a process of dividing a passage tube into several parts in the longitudinal direction and joining two blades to an inner wall portion of the passage tube divided, and a process of joining together the divided surfaces of the passage tube (see Japanese Published Patent Application No. H5-168882, for example.).

Next, a production method of a mixing element in related art having blades which are provided inside a cylindrical passage tube to form a plurality of fluid passages that are continuous with an opening in between is explained. This mixing element is produced by constructing the passage tube and the blades separately, and then joining them together. Twisting angles of the mixing element are 90° and 180° (see Japanese Published Patent Application No. H7-284642, for example.). Further, the mixing element in related art is formed of a plurality of spiral blades provided in a passage tube, without the blades provided at the central part of the passage tube and inner cylindrical tubes are disposed at intervals in the part where the blades are not provided, so as to enhance mechanical strength. The rotation angles of the blades are 90° and 180°, or 30°, 45° and 135° (see Japanese Published Patent Application No. 2001-170476, for example.).

Further, in the mixing element are provided with an outer cylindrical tube, blades provided in the outer cylindrical tube, and inner cylindrical tubes provided at intervals so as to provide these blades in the outer cylindrical tube (see Japanese Published Patent Application No. 2001-187313, for example.).

And again, there is a duet for mixed fluid, in which a plurality of annular sleeves and a plurality of kinds of agitation wings of the same length are concentrically disposed at a mixture portion inside a main tube (see Japanese Published Patent Application No. H11-304067 and Japanese Published Patent Application No. H10-339396, for example). This duct for mixed fluid is not a technology which is within the realm of a fundamental mixture principle as a static fluid mixer by means of rightward and leftward rotation, convergence, turnover and division, but is a technology utilized by means of turbulence generated by agitation wings at a gas flow velocity of 20-34 m/s, in a flow concurrent with a mixture of gases, and also in a horizontal state. Also, regarding a plurality of agitation wings which are not spiral in form but are simply twisted, that are placed inside a short tube, since those agitation wings are not disposed evenly at regular intervals, fluid becomes channeling, which makes it difficult to produce a homogeneous mixed fluid, hence it is difficult to obtain the evenness of quality and the homogeneity of reaction. Further, for processing-related reasons, only a casting method can be employed to produce agitation wings having twists, particularly if made of metal. Thus, production costs become high. Also, the thickness of the agitation wings becomes greater. Further, in twisting agitation wings by means of a forging method, which is an inexpensive production method, cracks may occur in a metal plate material, so that it is difficult to produce agitation wings, and it may be impossible to produce a large diameter (1 m or more in diameter) in particular, because of the occurrence of cracks caused by a metal plate material expanding and contracting.

Also, an exhaust gas treatment system using a static mixer has been reported (see Japanese Published Patent Application No. H7-88319, for example).

Regarding a mixing element of related art, it is necessary due to the difficulty in terms of production by means of a forging method to enlarge the sectional area, that is to say the diameter, of an opening (the central part) in proportion to the diameter of a passage tube, as the diameter of the passage tube, through which fluid flows, becomes large. For that reason, there is a disadvantage that the effectiveness of mixture and agitation diminishes, because packing density lowers, and fluid flows directly in an opening, that is, a short circuit occurs. Further, in order to compensate for the decrease in the effectiveness of mixture and agitation, it is necessary to provide a large number of mixing elements in the longitudinal axial center direction, so that equipment costs become high, and pressure loss becomes high as well.

Furthermore, if a mixing element of a large diameter (internal diameter of 1 m or more) with a rotation angle of 180°, for example, is produced by means of a forging method, production may become impossible because of the occurrence of cracks in a plate material. Also, mold costs become high as well. Also, there is a disadvantage that mixture and agitation efficiency diminishes greatly, because the enlargement of the diameter of an opening causes fluid to short-circuit at the opening. Further, if the mixing element is used as packing in a distillation column in related art, replacement and provision of a mixing element may become impossible, hampered by the size of a manway formed with the diameter in the range of 400 mm to 700 mm.

Moreover, when a mixing element of a small rotation angle (for example, approximately 10°) of the present invention is produced and used, the mixing element can be provided and used as packing in a distillation column in related art, and improvement in packing density enables high performance and high productivity to be obtained.

[Patent Literature 1] Japanese Published Patent Application No. S58-128134
[Patent Literature 2] Japanese Published Patent Application No. H5-168882
[Patent Literature 3] Japanese Published Patent Application No. H7-80279
[Patent Literature 4] Japanese Published Patent Application No. H7-284642
[Patent Literature 5] Japanese Published Patent Application No. 2001-170476
[Patent Literature 6] Japanese Published Patent Application No. 2001-187313
[Patent Literature 7] Japanese Published Patent Application No. H11-304067
[Patent Literature 8] Japanese Published Patent Application No. H10-339396
[Patent Literature 9] Japanese Published Patent Application No. H7-88319
[Patent Literature 10] European Patent No. 0678329
[Patent Literature 11] U.S. Pat. No. 5,605,400
[Patent Literature 12] U.S. Pat. No. 6,431,528
[Non-patent Literature 1] S. J. Chen et al. "STATIC MIXING HANDBOOK" Chemical Research Institute, published in June 1973
[Non-patent Literature 2] Kiichiro Matsumura, Yasushi Morishima et al. "STATIC MIXER—FUNDAMENTALS AND APPLICATIONS"
Nikkan Kogyo Shimbun, Ltd., published on Sep. 30, 1981

As regards a mixing element and a static fluid mixer using the mixing element in related art, the larger the diameter of a mixing element becomes, the larger the diameter of the axial center portion becomes, due to production of blades by means of an inexpensive production method. Thus, since decrease in packing density makes mixture and agitation efficiency diminish, it is necessary to increase an amount of time when fluids are mixed and agitated. Therefore, columns such as an absorption column and a distillation column become greater in height, and so equipment costs become high. In addition, production and assembly become difficult as a diameter becomes large, and so mold costs become high as well. Further, the use of a mixing element in related art as packing in a distillation column in related art may have been impossible, because of the size of members such as a passage tube, blades and the like constituting the mixing element and performance-related aspects. Also, similarly, it may have been impossible to use a mixing element in related art as packing in an absorption column in related art for treating large gas volume.

Further, a large gas-liquid contact interfacial area, a high-performance liquid distribution function, and a wide operation control range under low pressure loss have been demanded regarding a distillation column using packing in related art (see Japanese Published Patent Application No. H7-80279, for example.). And again, as volume of exhaust gas generated from incinerators, vessels, power plants, rotary kilns and the like to be treated becomes large (for example, 0.1 million to 2 million Nm$^3$/h), such advantages as high performance, less working space, less energy consumption and less cost of an absorption column used in exhaust gas treatment apparatuses are desired.

SUMMARY OF THE INVENTION

A mixing element of the present invention for solving the above-mentioned problems is a mixing element includes: a cylindrical passage tube through which fluid flows; spiral first blades of rightward rotation (in the clockwise direction) or leftward rotation (in the counterclockwise direction) provided in the cylindrical passage tube; a first inner cylindrical tube disposed in the axial center portion of the first blades; spiral second blades of rightward rotation or leftward rotation provided in the first inner cylindrical tube; and a second inner cylindrical tube disposed in the axial center portion of the second blades. According to the present invention, a mixing element is provided, in which high mixture efficiency is obtained, production thereof is facilitated, and production cost is low. Further, a mixing element with low pressure loss and high mixture efficiency capable of being applied to a gas-liquid contact apparatus of a large diameter (1 m or more) of the distillation column method, stripping column method and absorption column method, and a static fluid mixer using the mixing element are provided.

According to a mixing element of the present invention, with improvement in packing density (m$^2$/m$^3$), mixture and agitation efficiency will be improved, and so gas-liquid contact time will be reduced. Further, since the production is facilitated, production costs will be reduced as well. Further, the production of a distillation column or absorption column having a large diameter will be simplified. And again, high performance obtained by replacing packing used in a distillation column or absorption column in related art which already exists, and reduction in production costs due to energy saving are achieved. It should be noted that a packing density mentioned here (used later as well) shows the whole surface area (m$^2$) of blades per unit volume (m$^3$) of a mixing element. Specifically, it shows the whole surface area (m$^2$) of first and second blades per unit volume (m$^3$) in a passage tube.

DESCRIPTION OF THE PREFERRED EMBODIMENTS

Figure 1:
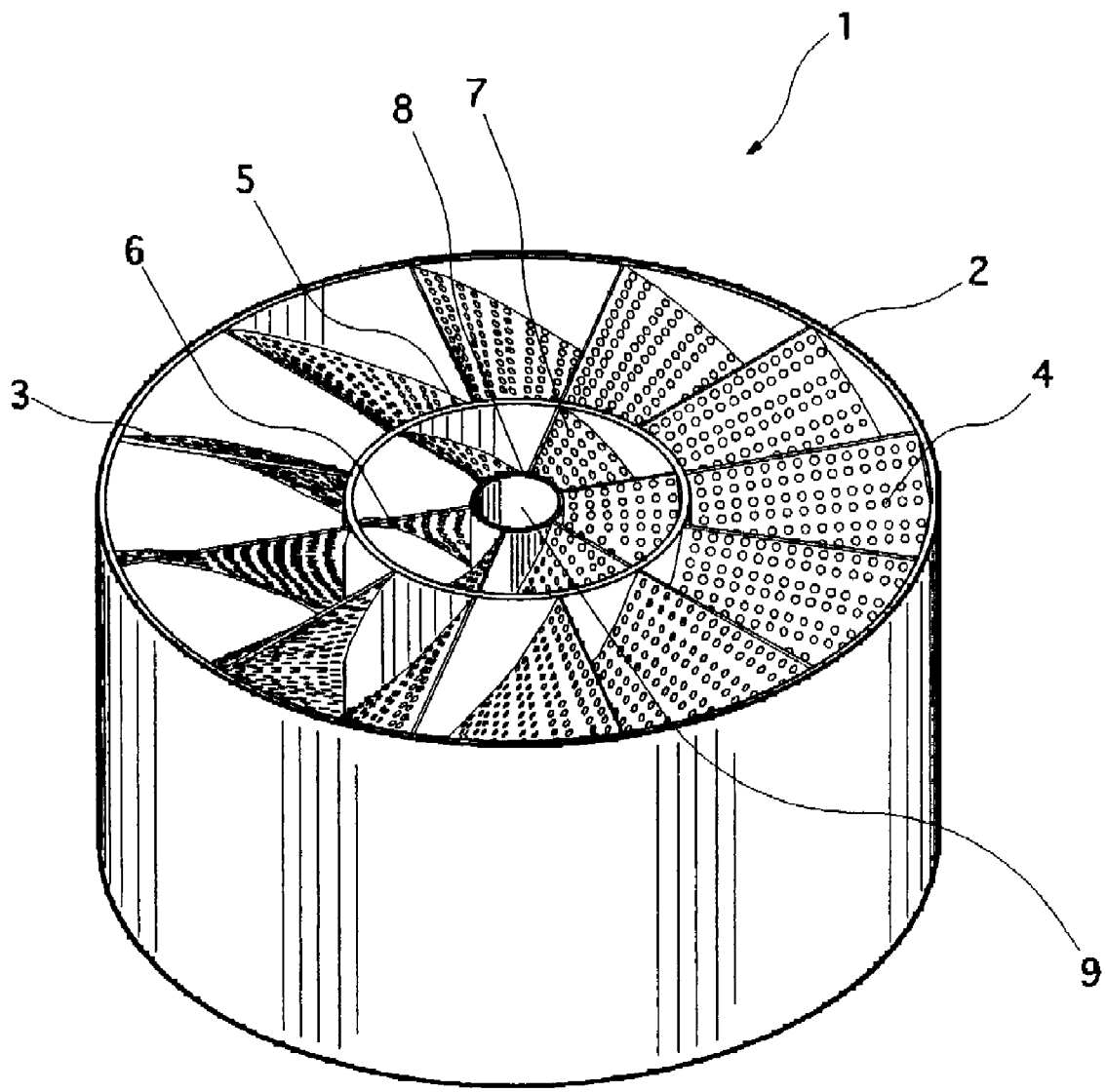
[FIG. 1] A perspective view of a 90° rightward rotation type mixing element according to an embodiment of the present invention.
Figure 2:
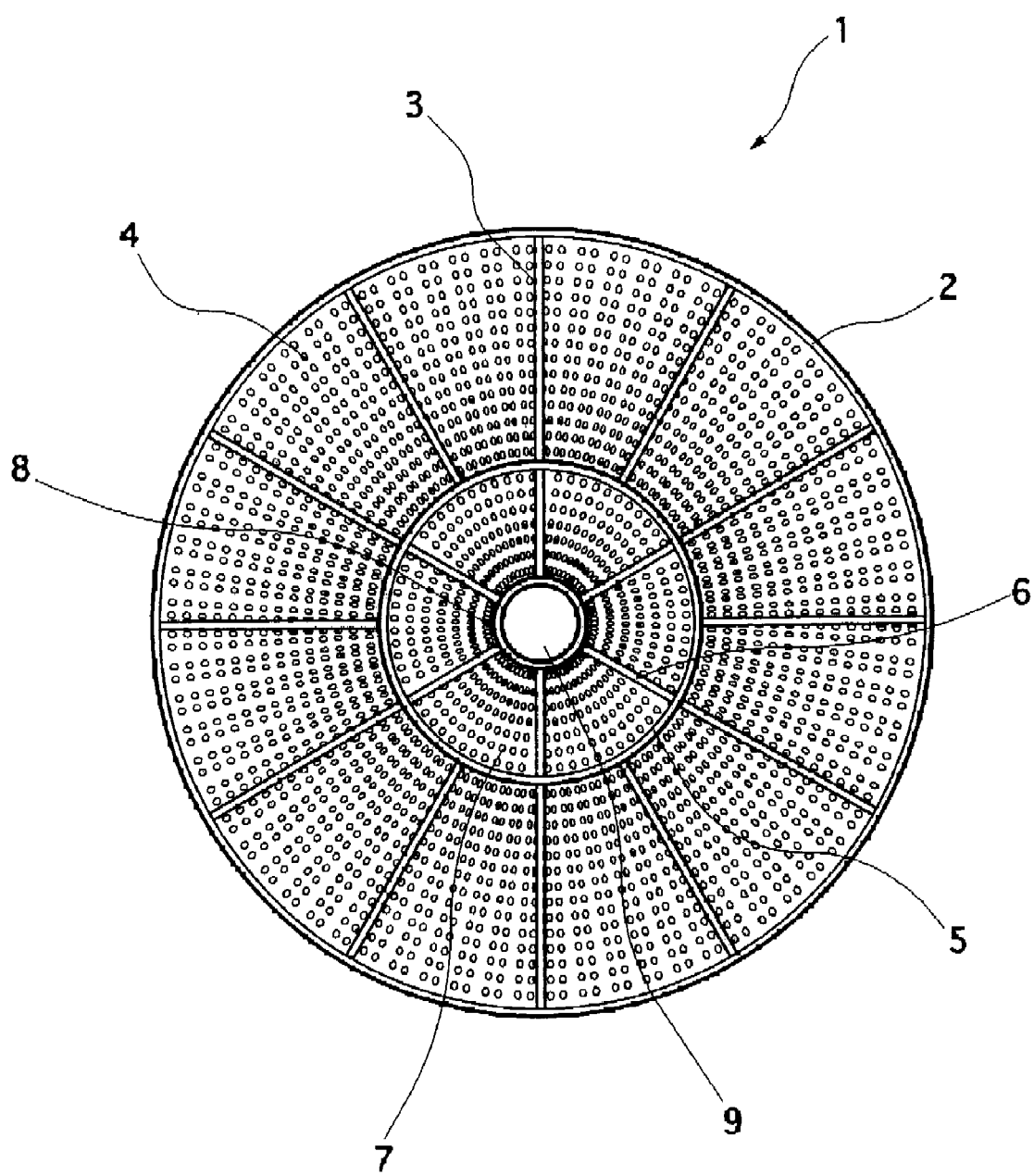
[FIG. 2] Similarly, a bottom view of a mixing element.
Figure 3:
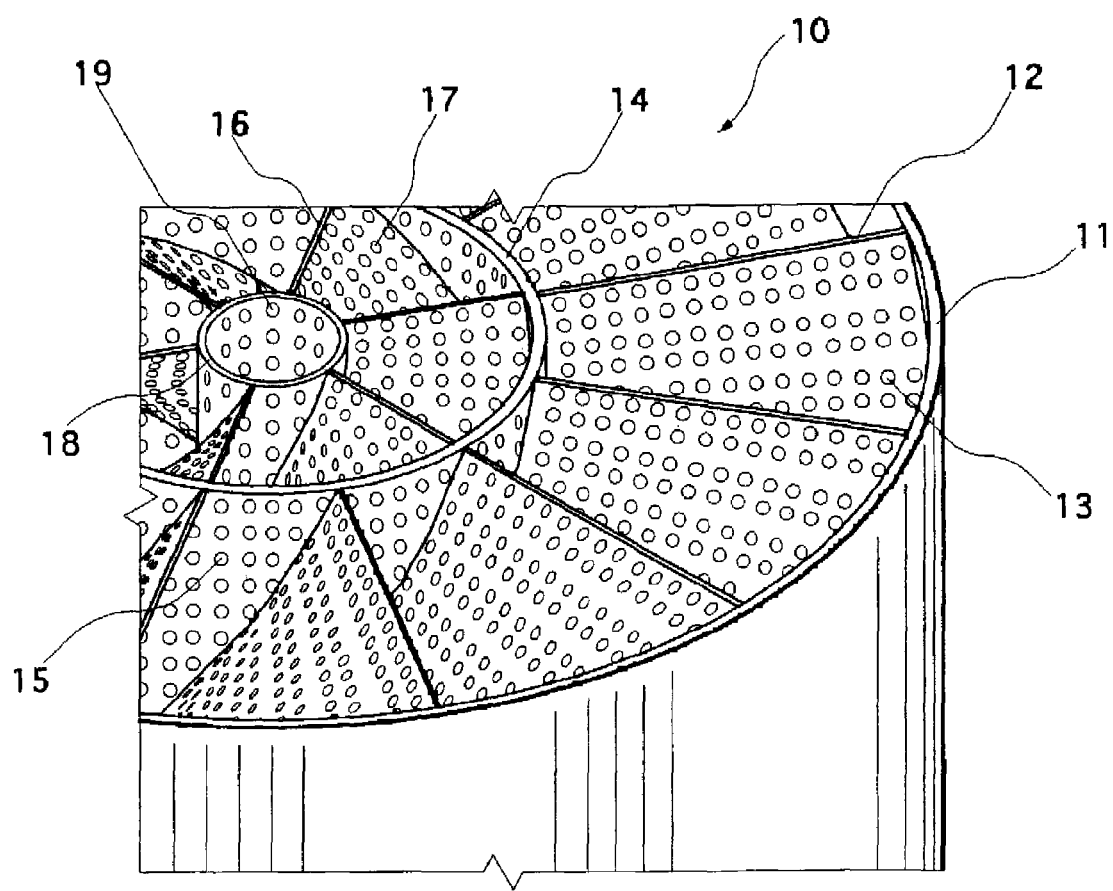
[FIG. 3] Similarly, a partly-enlarged perspective view of a mixing element.
Figure 4:
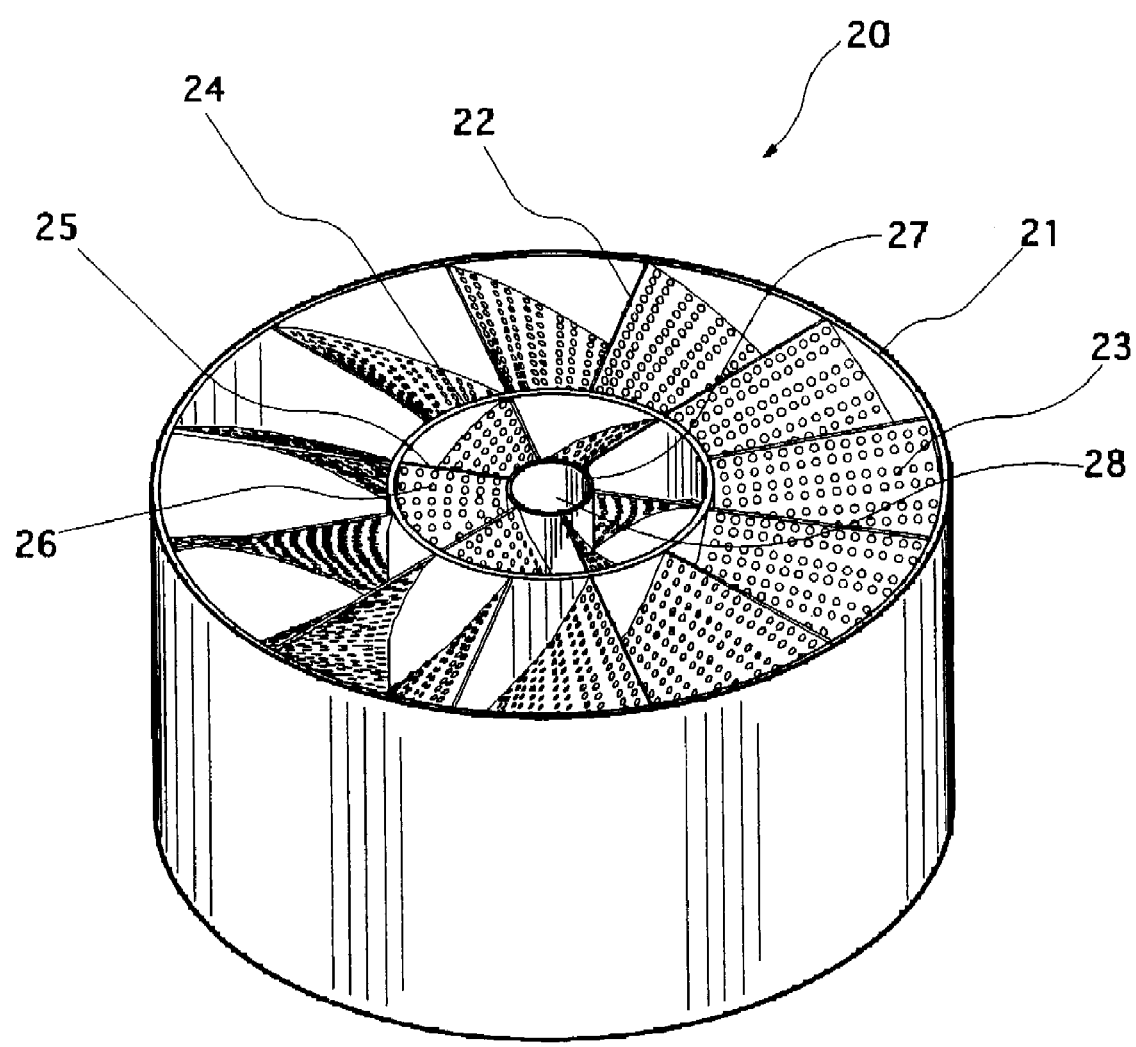
[FIG. 4] A perspective view of a mixing element formed of rightward rotation type first blades and leftward rotation type second blades according to an embodiment of the present invention.
Figure 5:
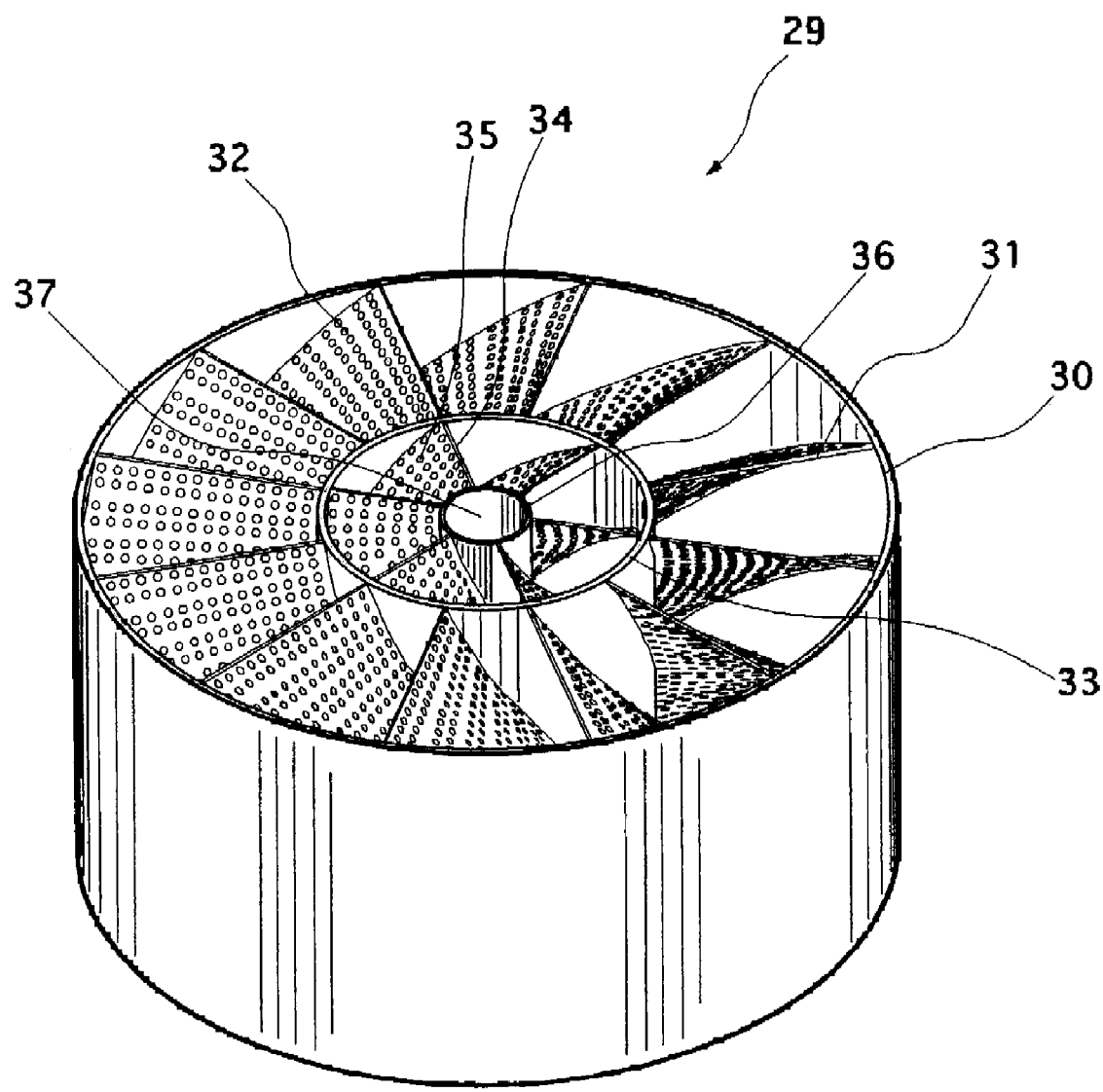
[FIG. 5] A perspective view of a 90° leftward rotation type mixing element according to an embodiment of the present invention.
Figure 6:
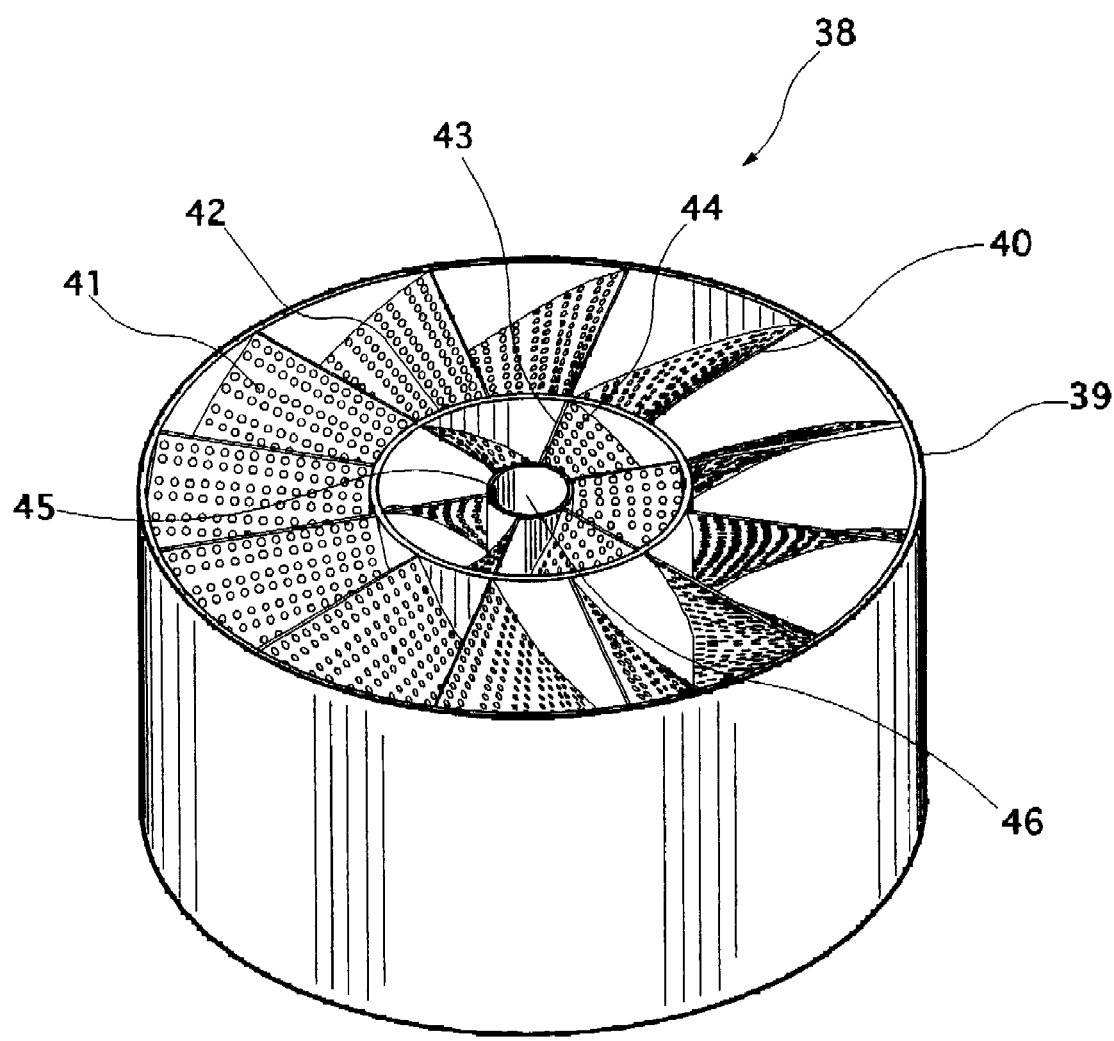
[FIG. 6] Similarly, a perspective view of a mixing element formed of leftward rotation type first blades and rightward rotation type second blades.
Figure 7:
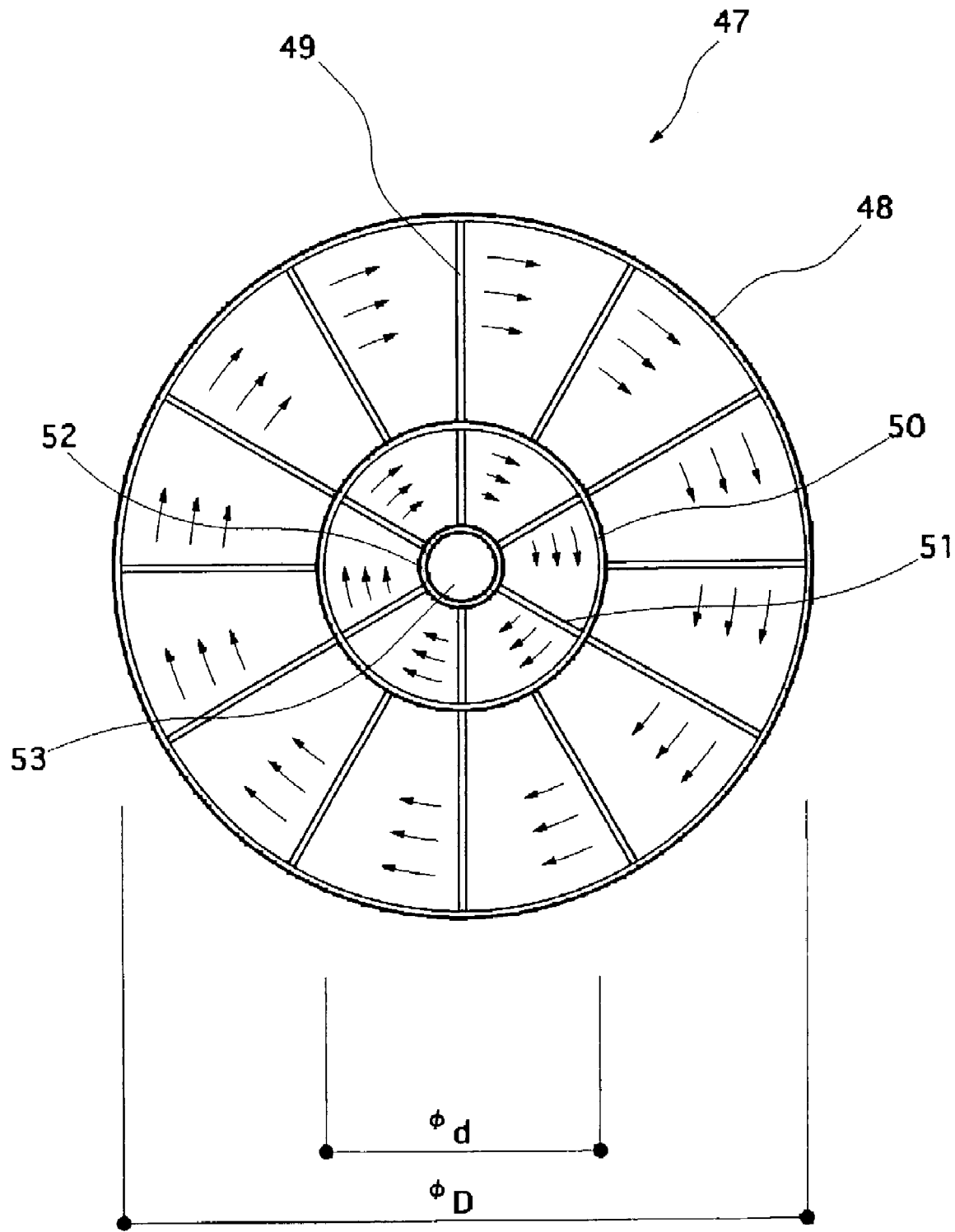
[FIG. 7] An explanatory view showing a cross-section of rightward rotation type mixing element according to an embodiment of the present invention.
Figure 8:
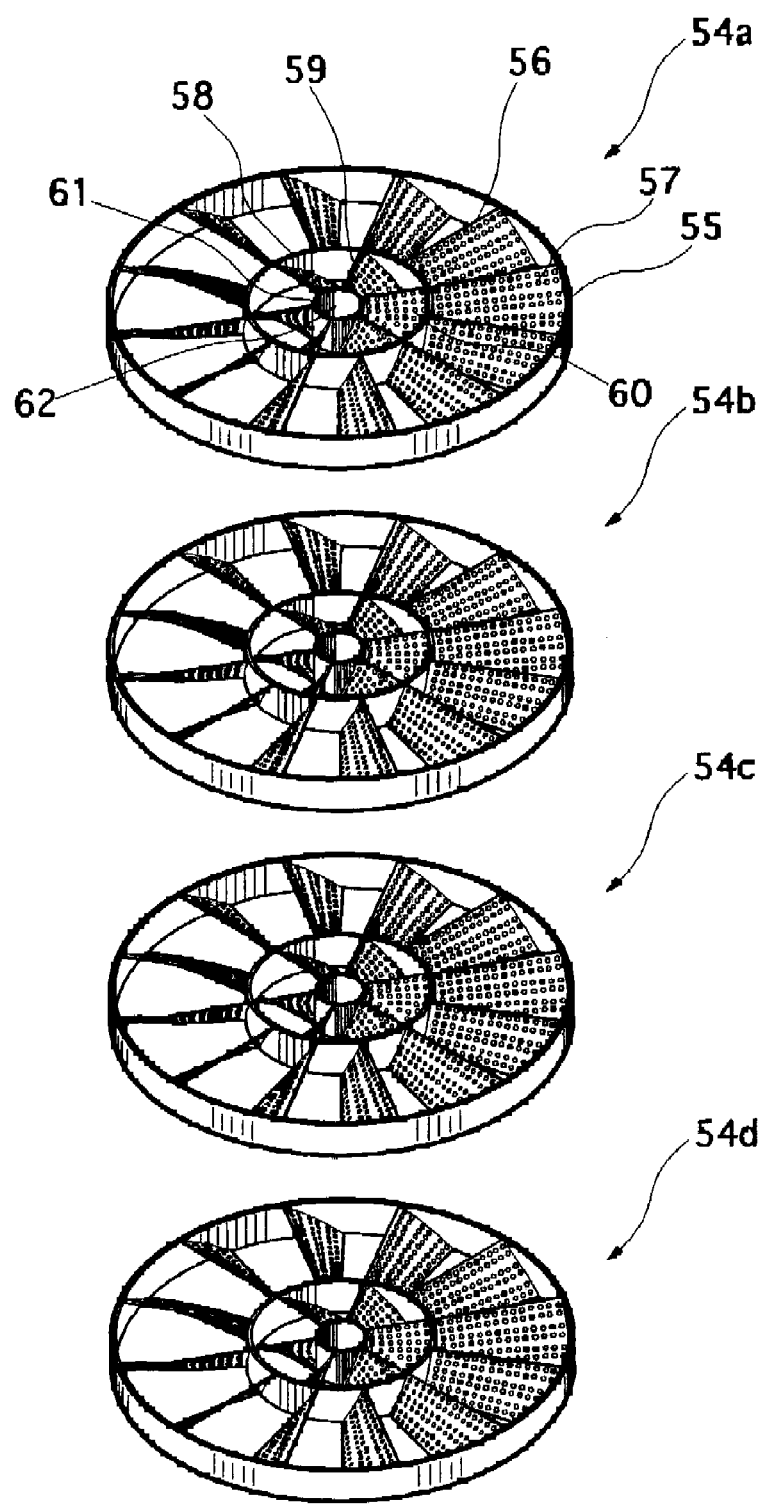
[FIG. 8] A perspective view of 15° rightward rotation type mixing elements according to an embodiment of the present invention.
Figure 9:
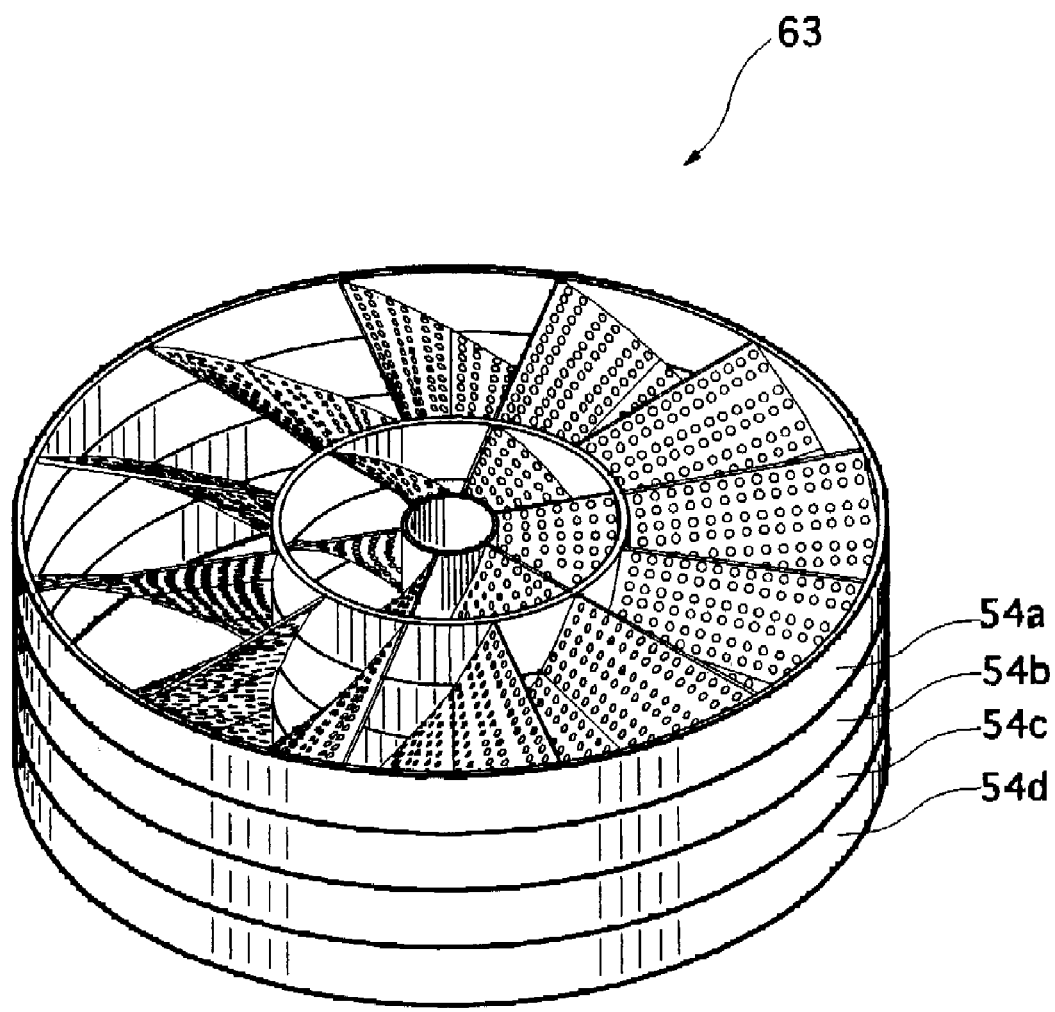
[FIG. 9] A perspective view of a mixing element wherein four mixing elements made of 15° rightward rotation type blades are stacked, according to an embodiment of the present invention.
Figure 10:
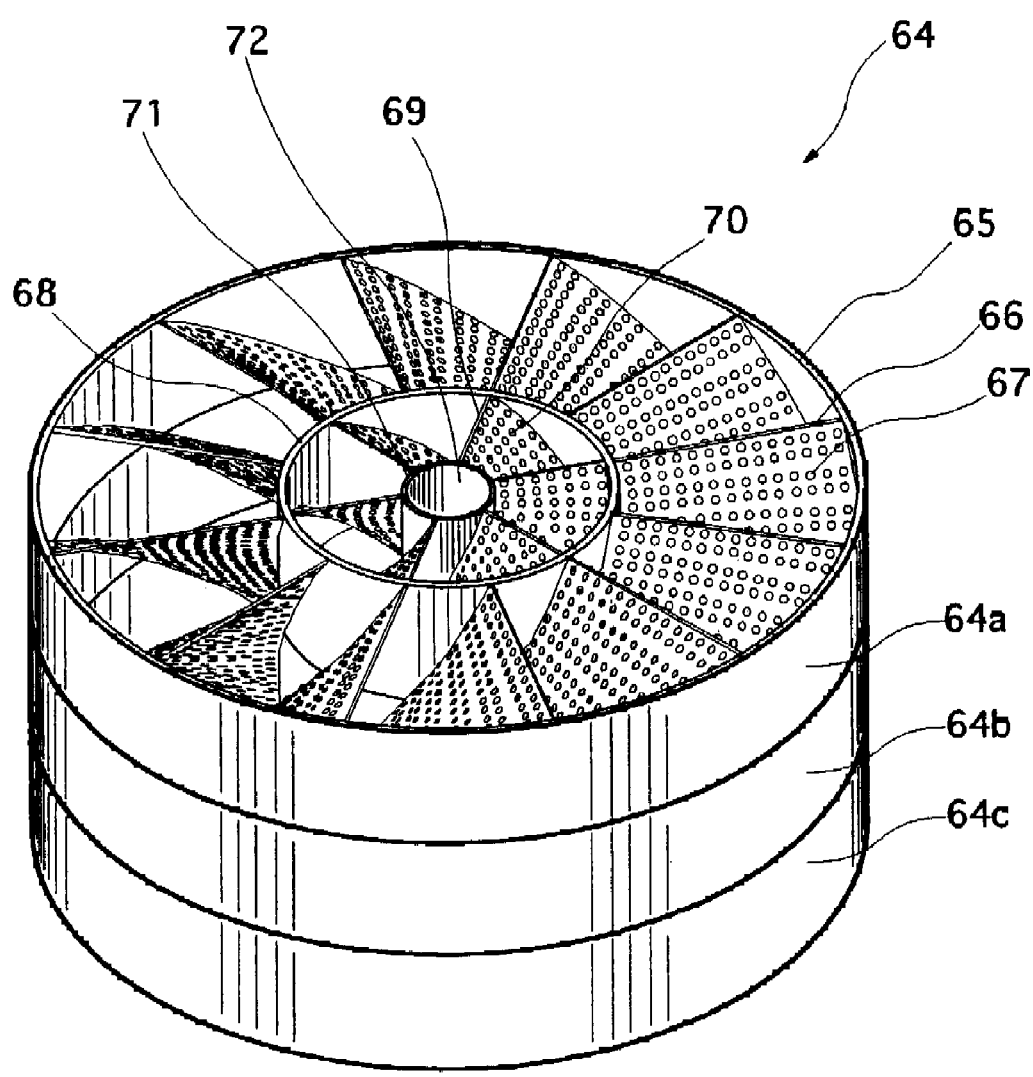
[FIG. 10] Similarly, a perspective view of a mixing element wherein three 30° rightward rotation type mixing elements are stacked.
Figure 11:
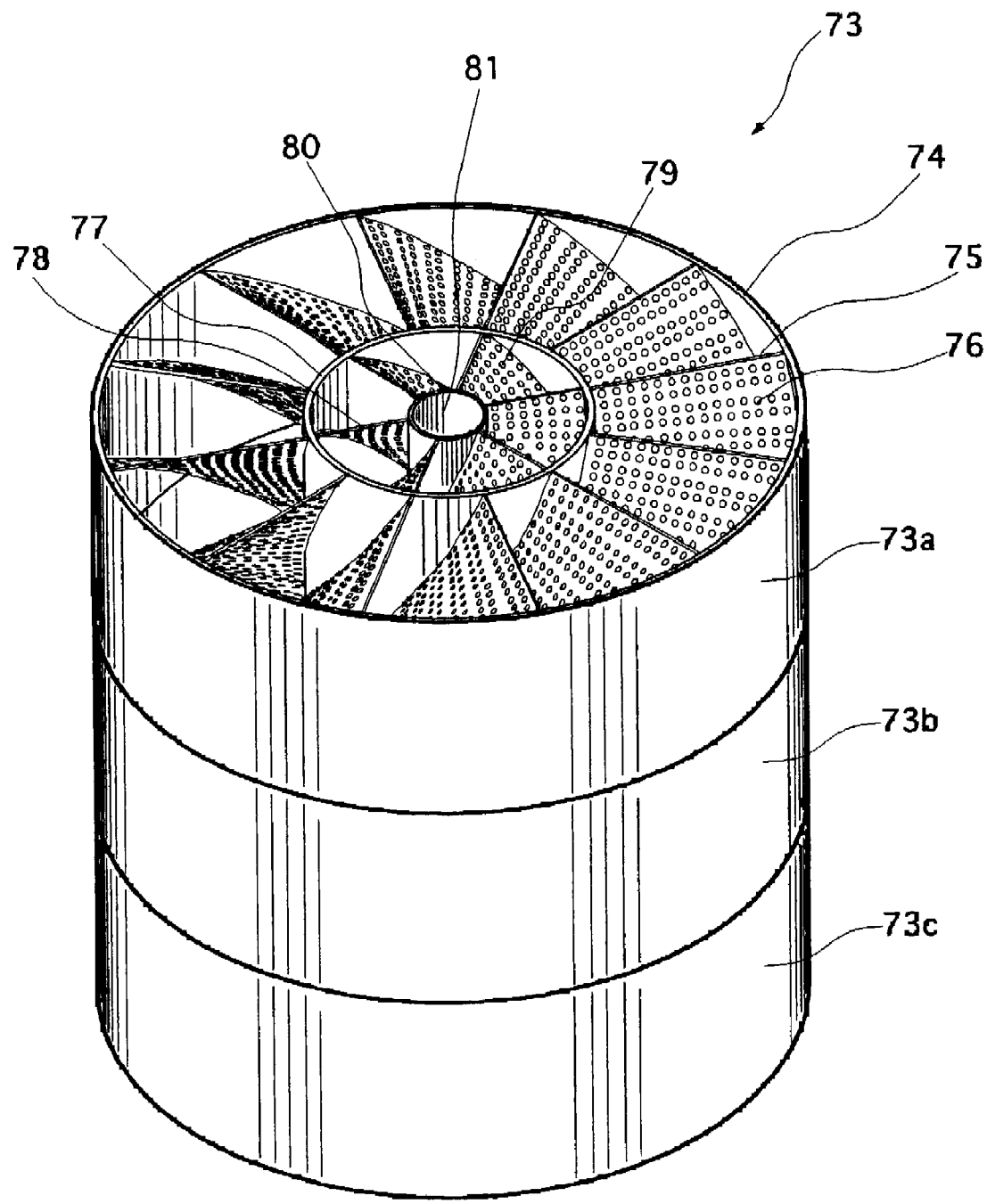
[FIG. 11] Similarly, a perspective view of a mixing element wherein three 60° rightward rotation type mixing elements are stacked.
Figure 12:
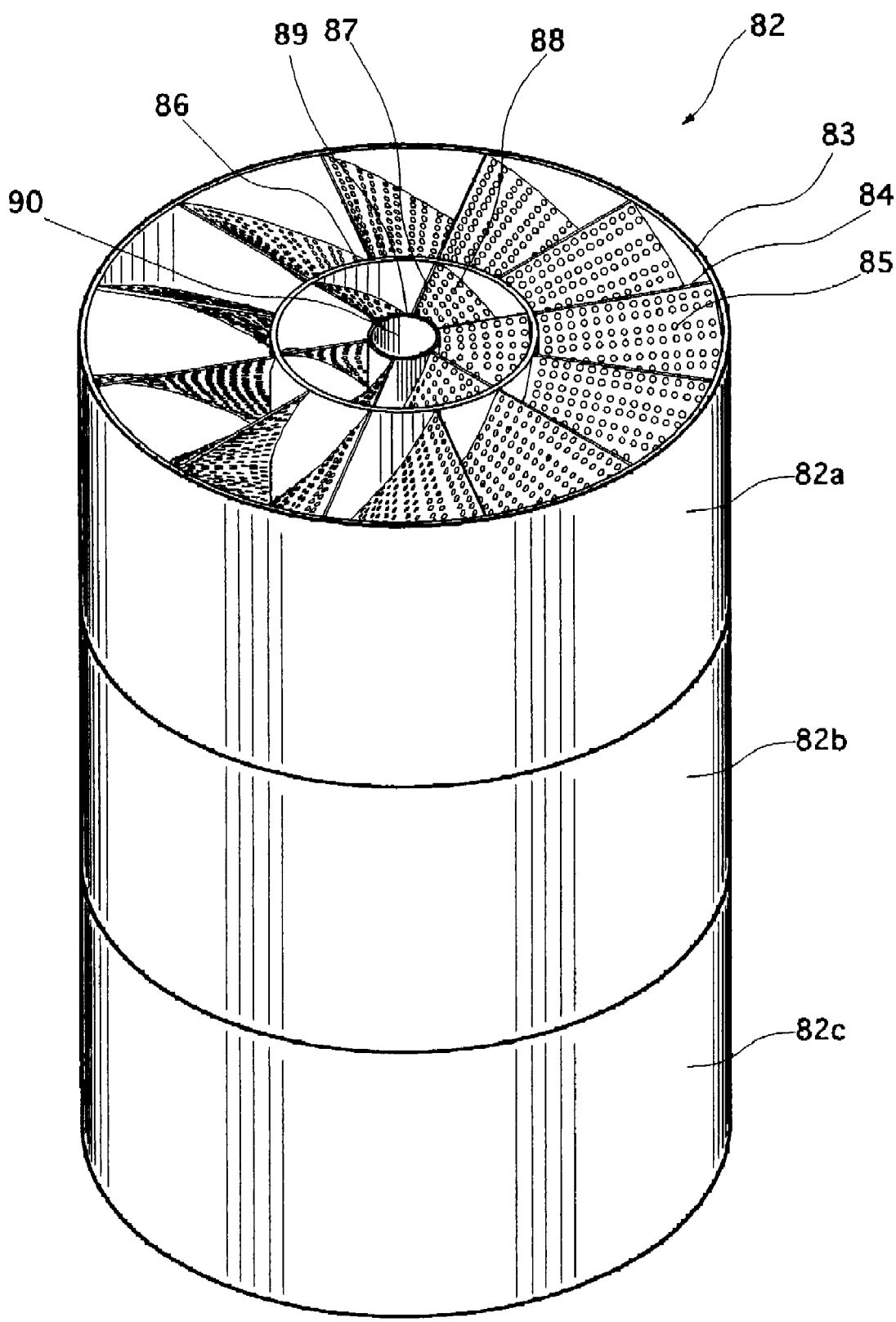
[FIG. 12] Similarly, a perspective view of a mixing element wherein three 90° rightward rotation type mixing elements are stacked.
Figure 13:
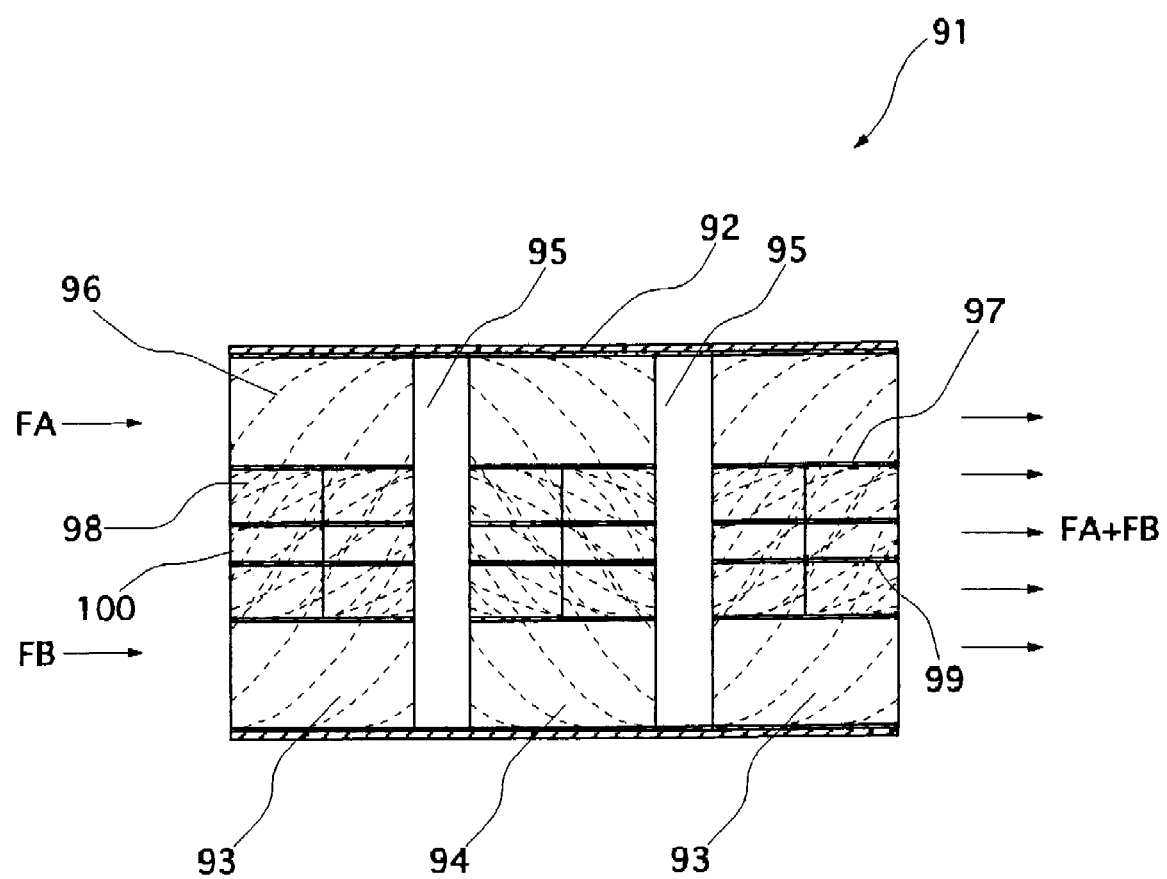
[FIG. 13] A schematic sectional side view of a static fluid mixer using a mixing element according to an embodiment of the present invention.
Figure 14:
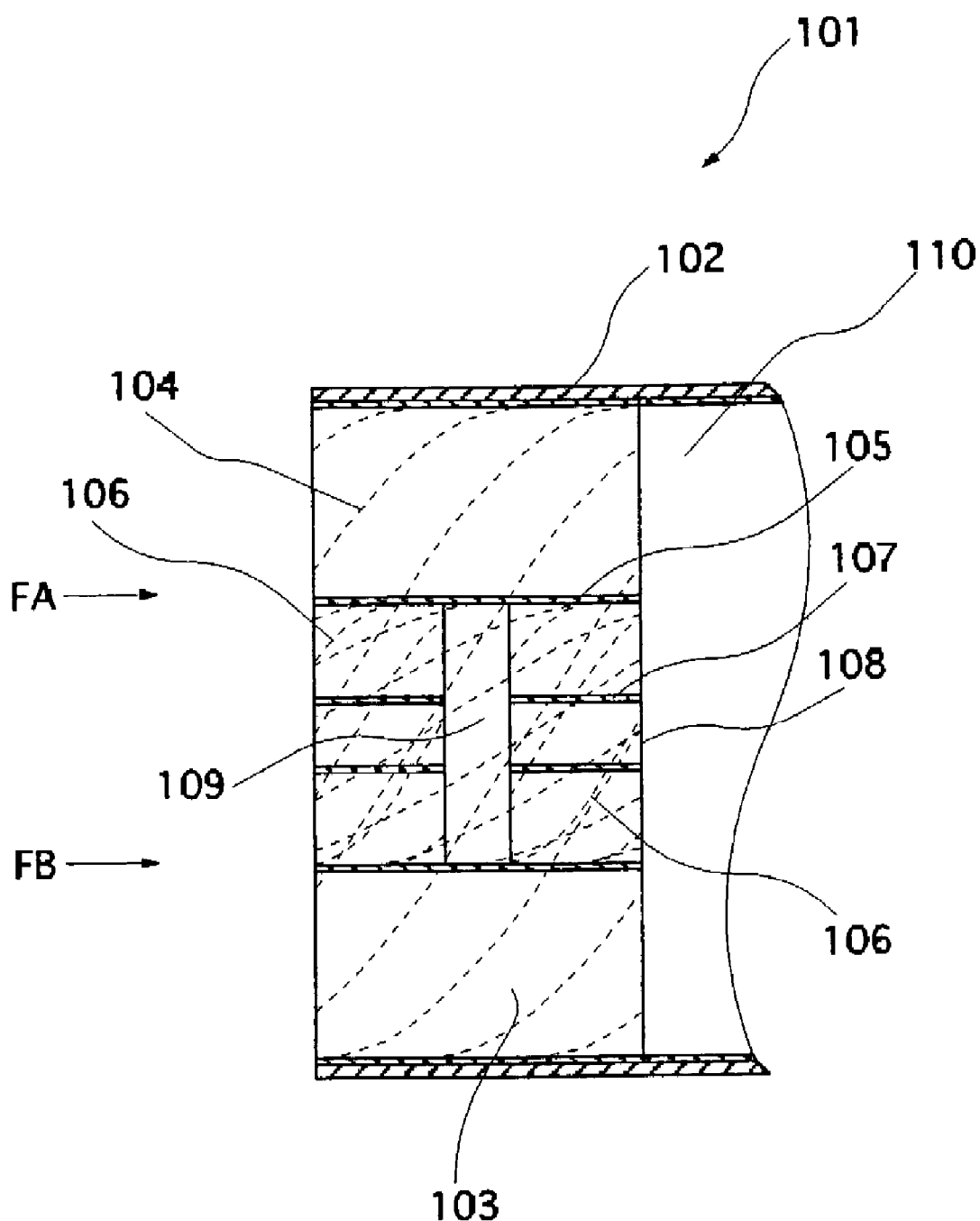
[FIG. 14] Similarly, a schematic partly-sectional side view of a static fluid mixer.
Figure 15:
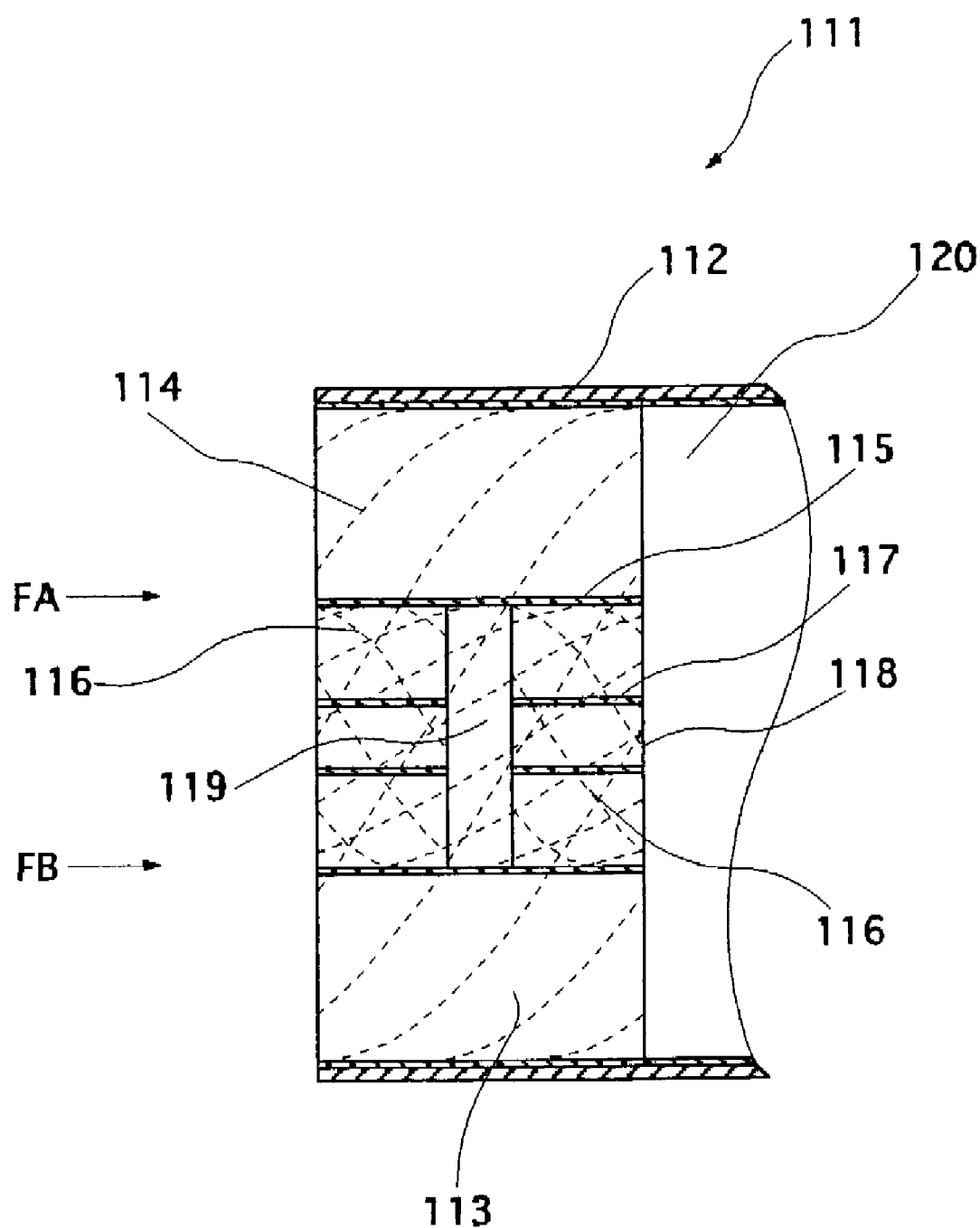
[FIG. 15] Similarly, a schematic partly-sectional side view of a static fluid mixer.
Figure 16:
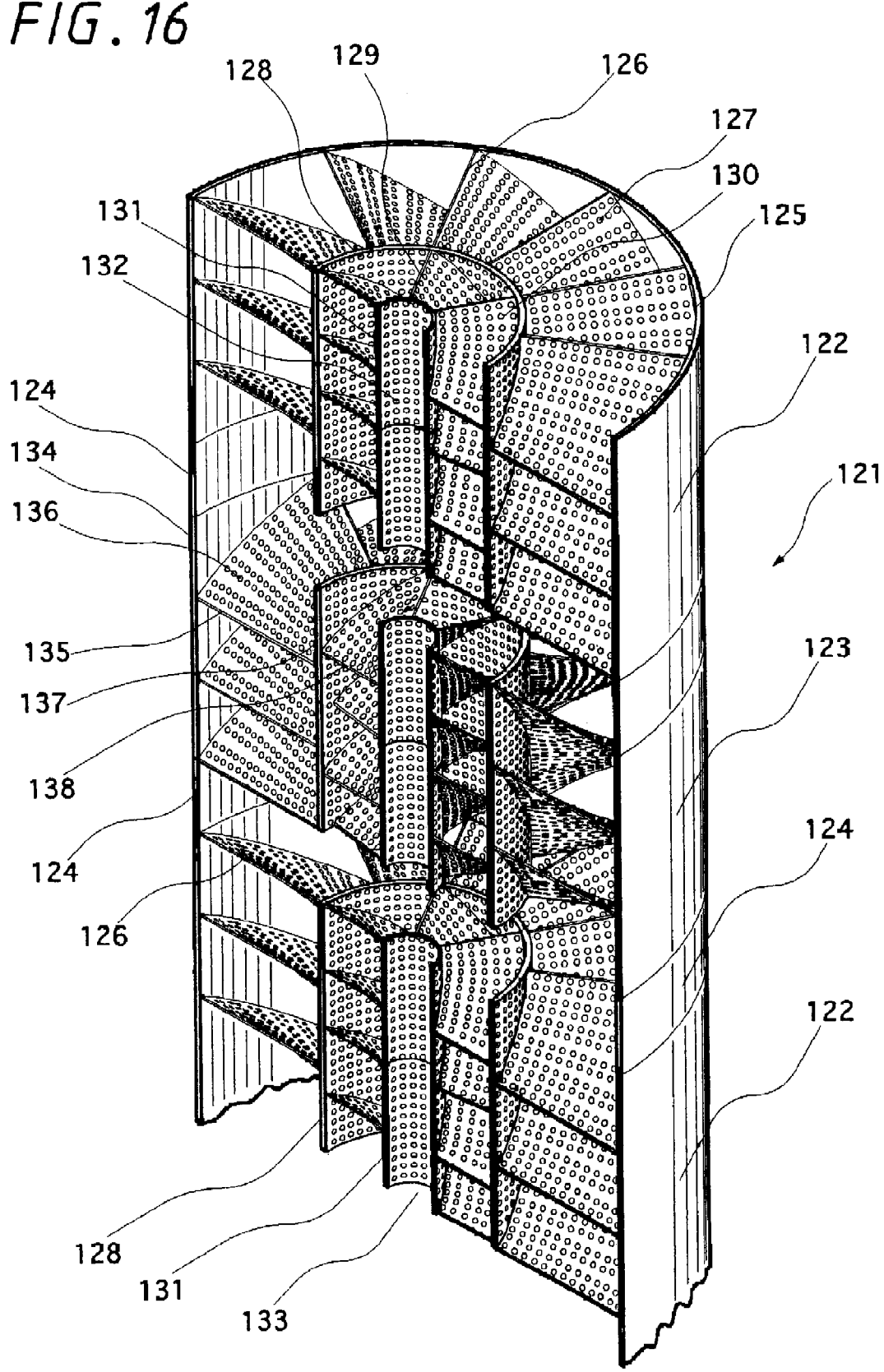
[FIG. 16] A schematic longitudinal section perspective view of a static fluid mixer according to the present invention.
Figure 17:
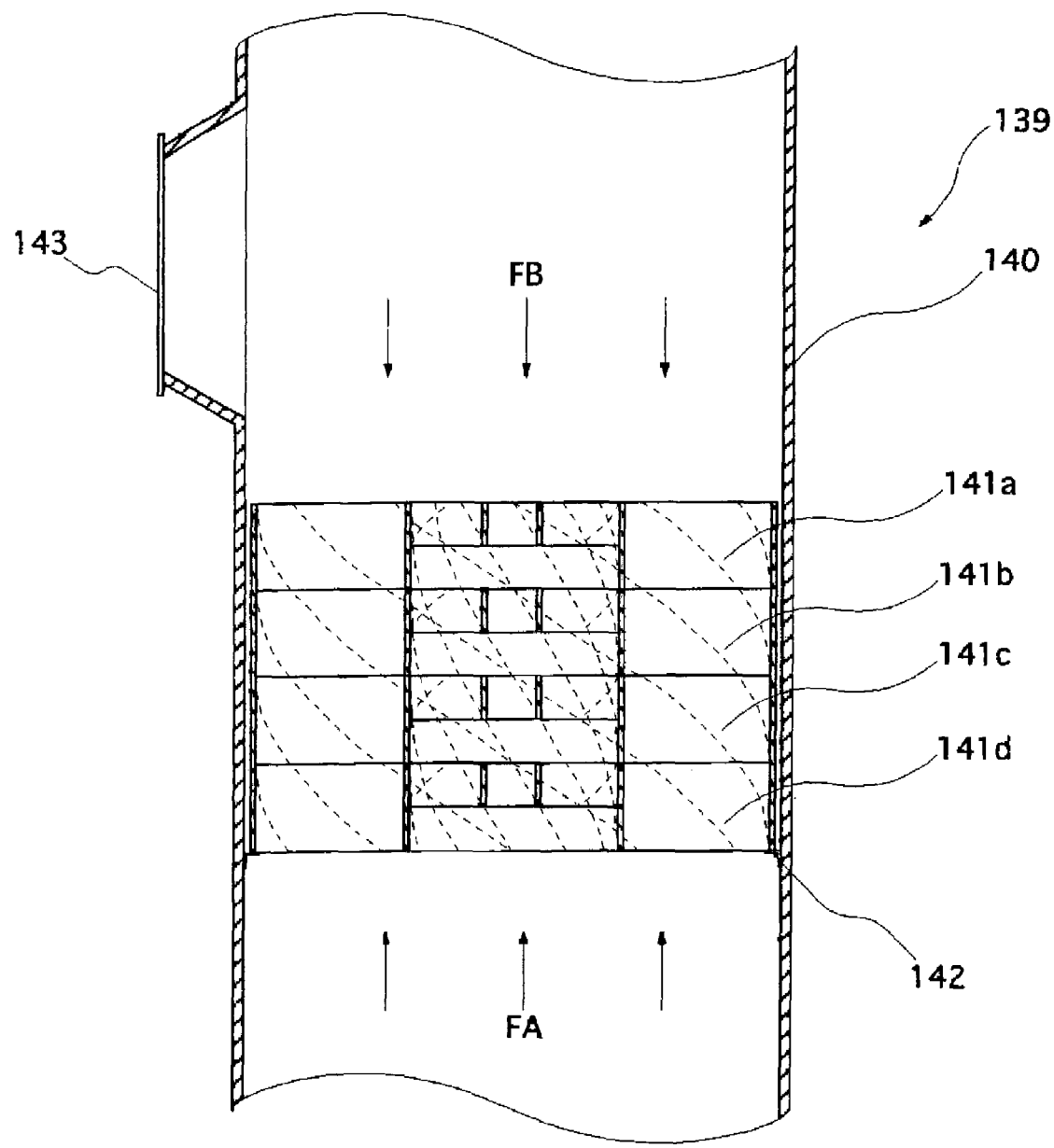
[FIG. 17] A schematic partly-longitudinal-sectional view showing an application example when a mixing element according to the present invention is applied to a distillation column method gas-liquid contact apparatus.
Figure 18:
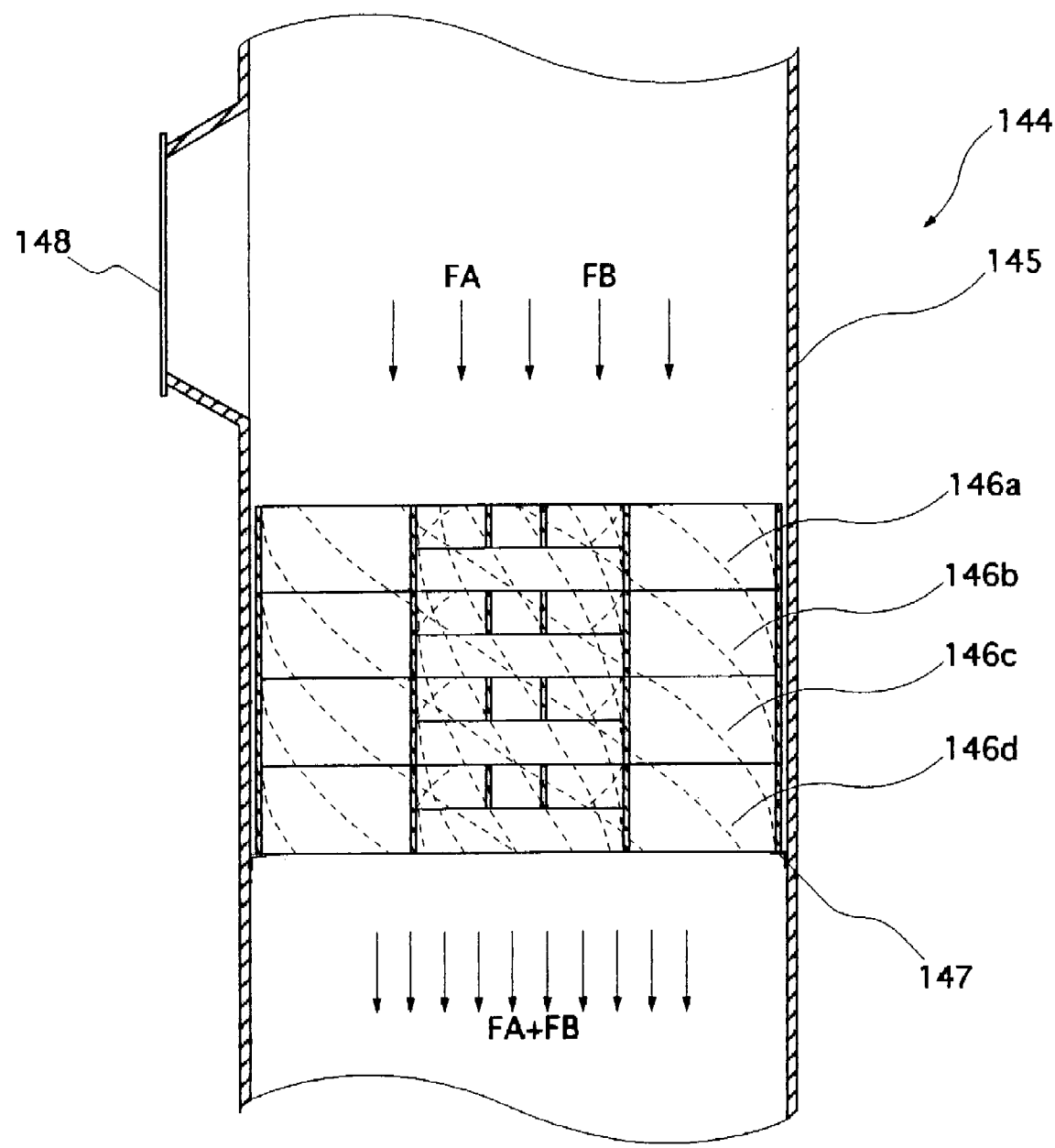
[FIG. 18] Similarly, a schematic partly-longitudinal-sectional view showing an application example when a mixing element according to the present invention is applied to an absorption column method gas-liquid contact apparatus.
Figure 19:
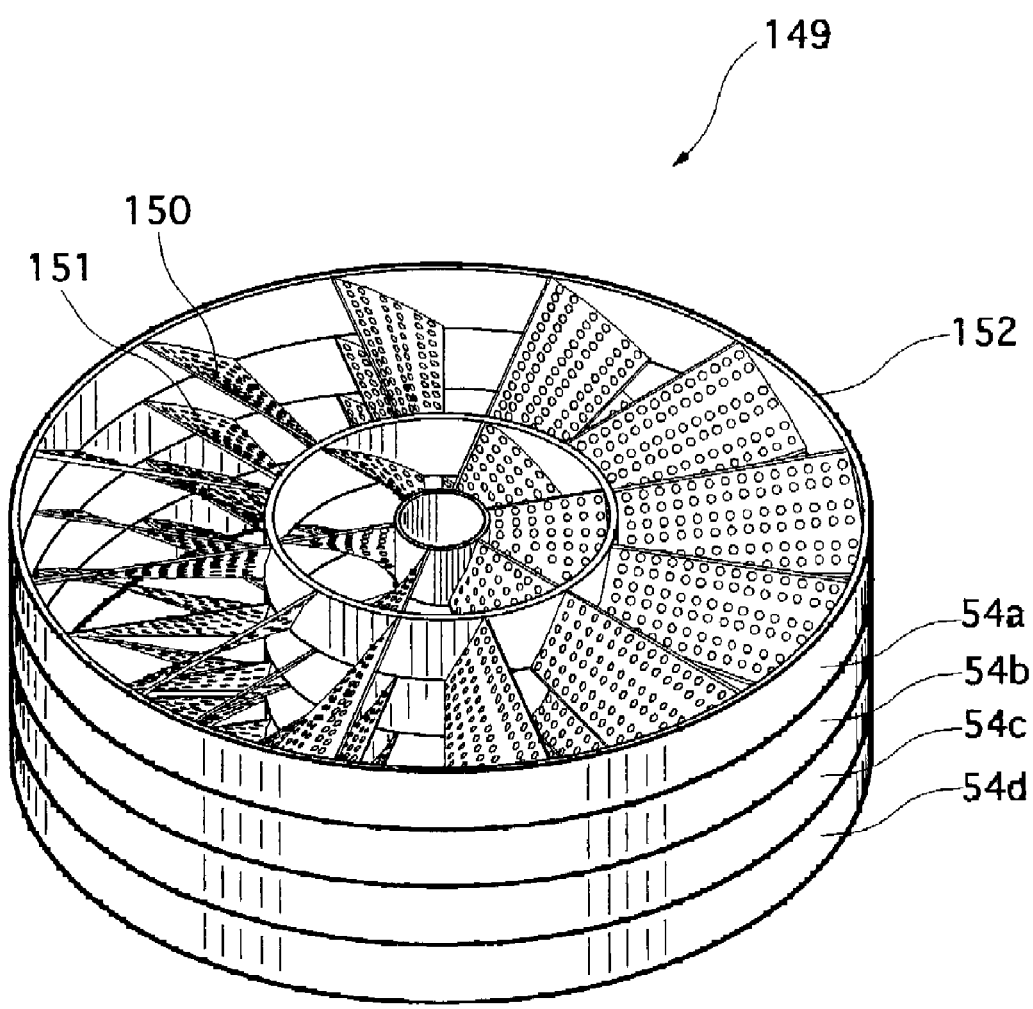
[FIG. 19] A perspective view of a mixing element wherein four mixing elements made of 15° rightward rotation type blades are stacked, according to an embodiment of the present invention.
Figure 20:
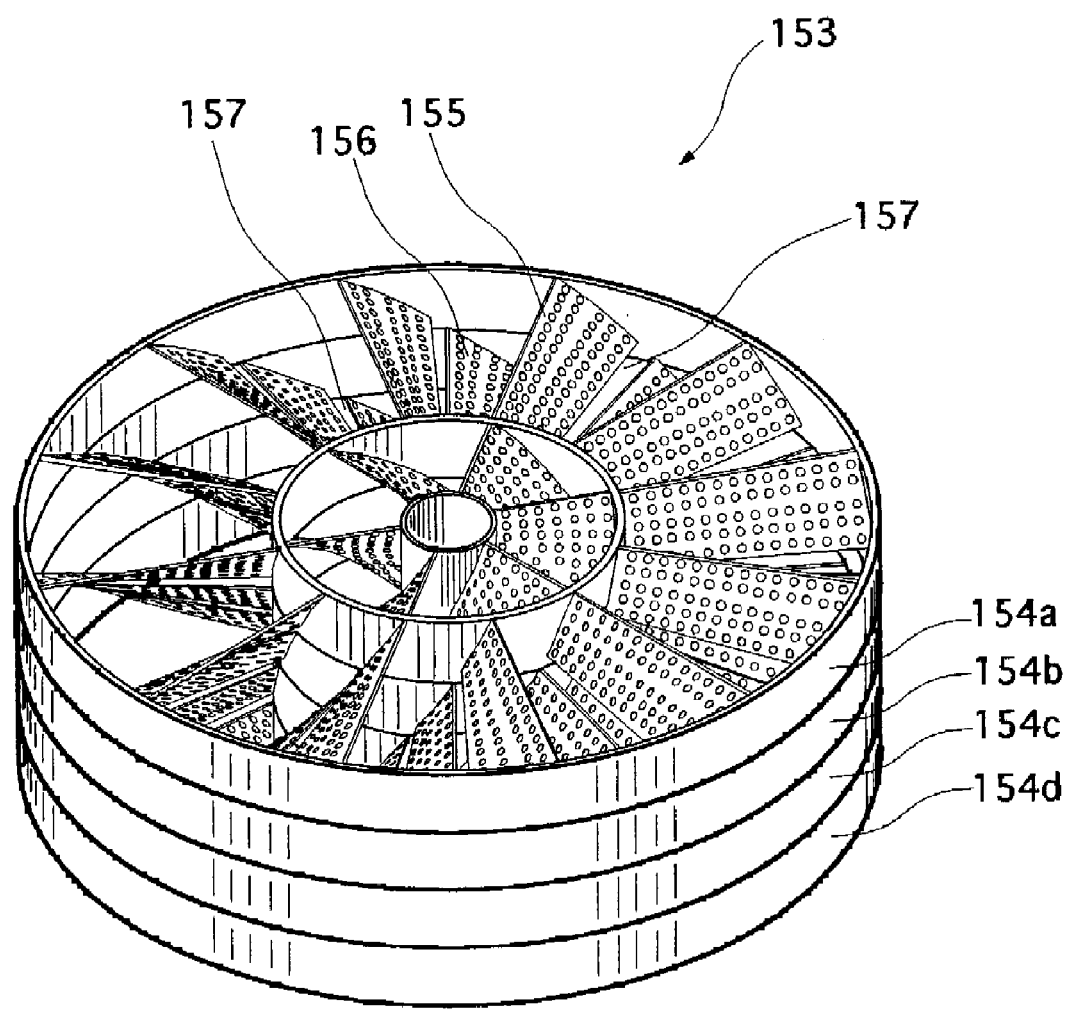
[FIG. 20] A perspective view of a mixing element wherein four mixing elements made of 15° rightward rotation type blades are stacked, according to an embodiment of the present invention.
Figure 21:
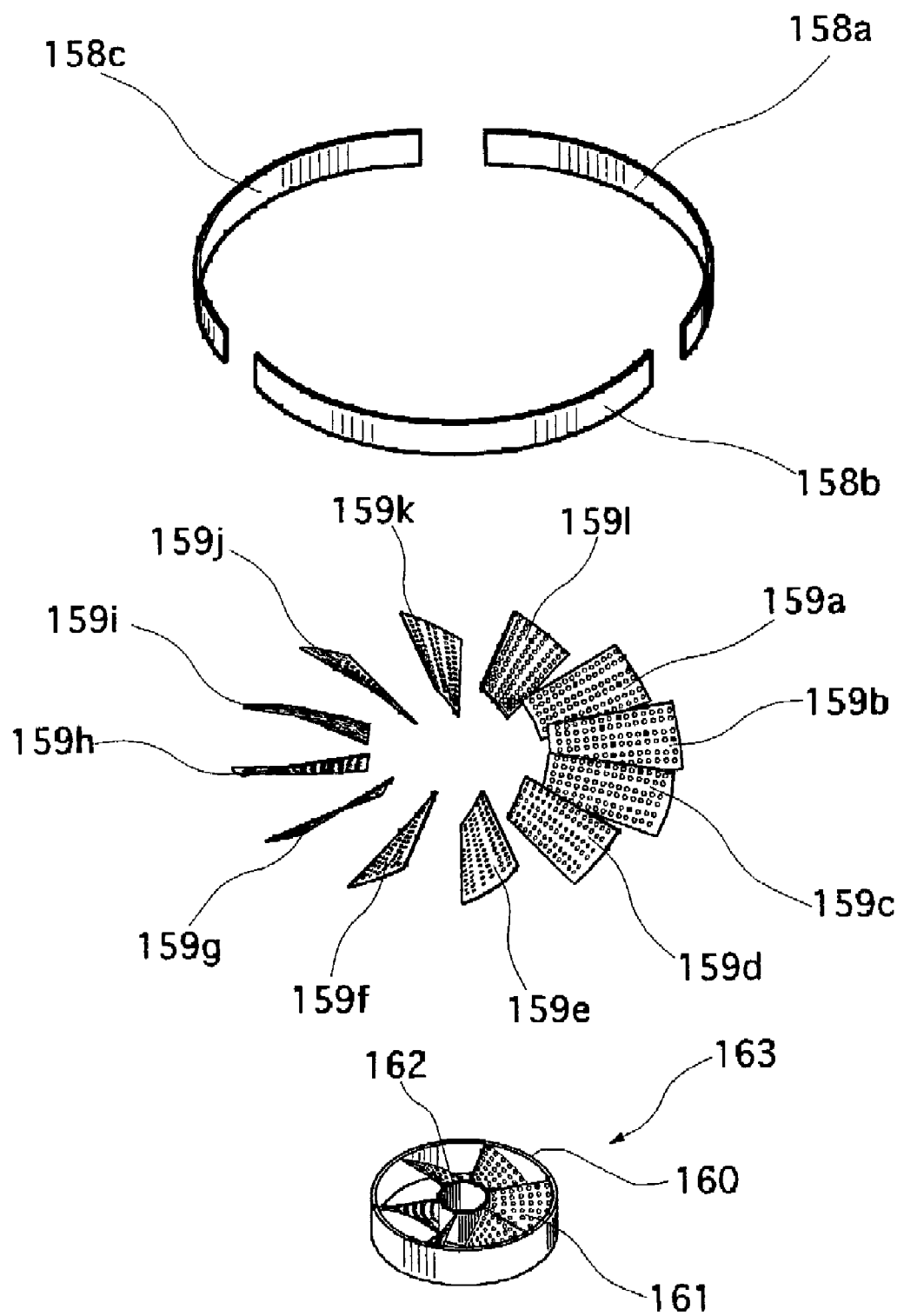
[FIG. 21] A perspective view of components forming a mixing element made of 15° rightward rotation type blades, according to an embodiment of the present invention.
Figure 22:
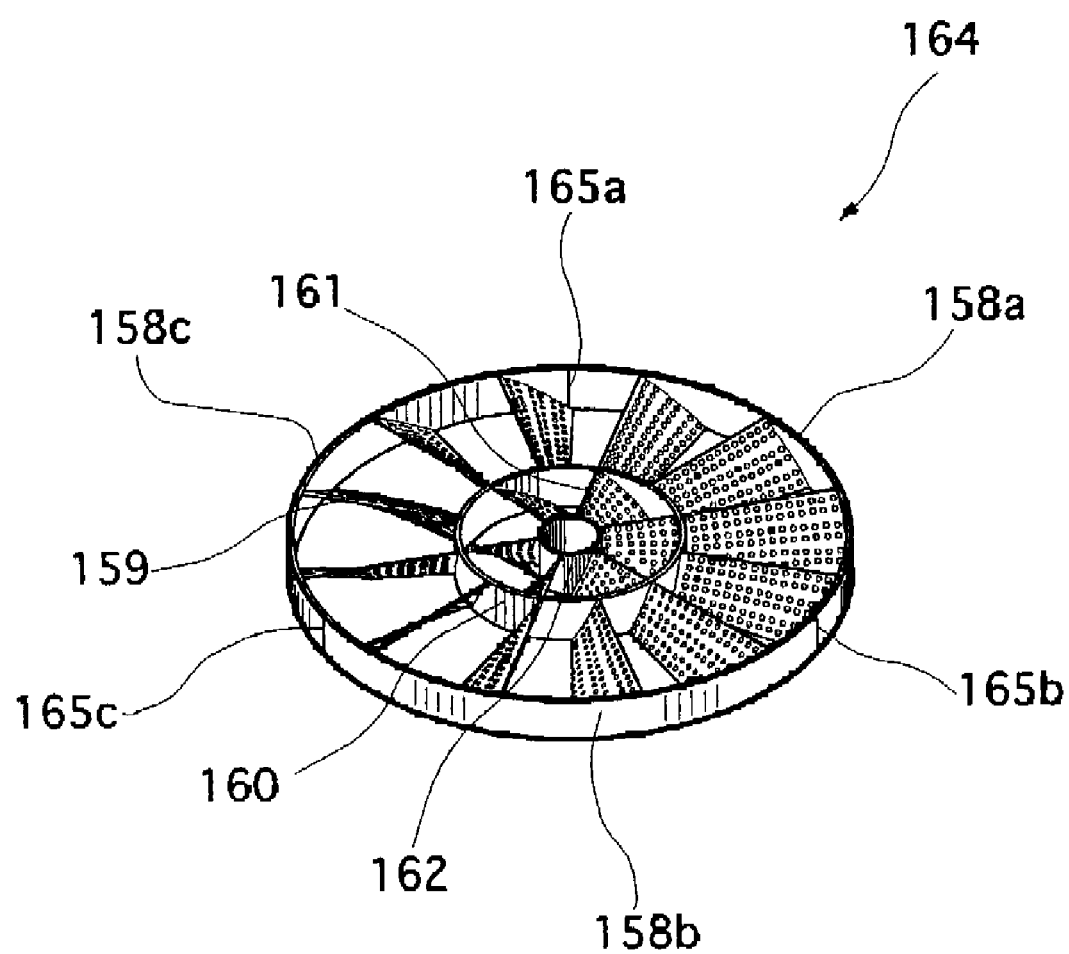
[FIG. 22] perspective view of a mixing element produced using components forming a mixing element made of 15° rightward rotation type blades, according to an embodiment of the present invention.
Figure 23:
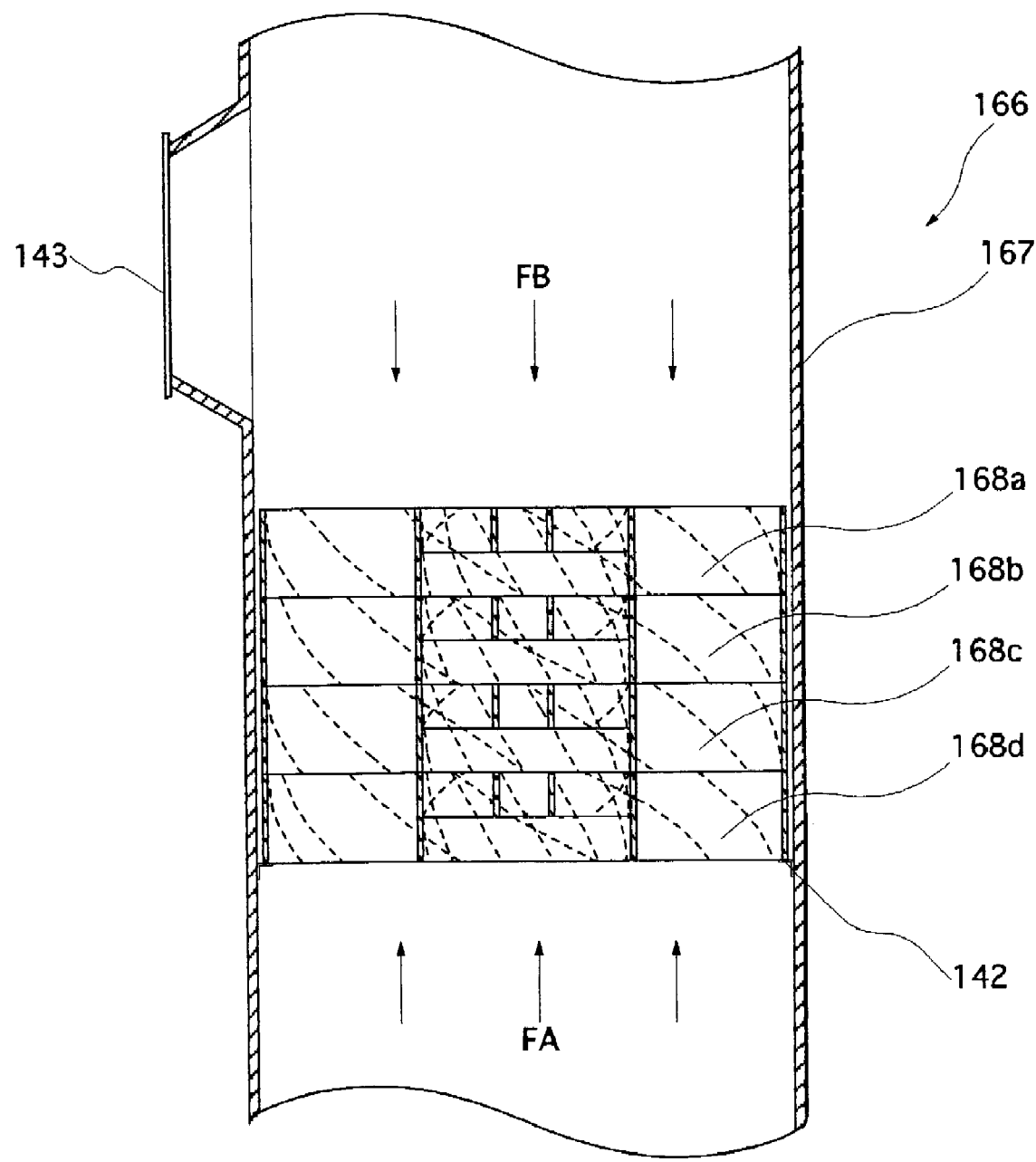
[FIG. 23] A schematic partly-longitudinal sectional view showing an application example when a mixing element according to the present invention is applied to a distillation column method gas-liquid contact apparatus.
Figure 24:
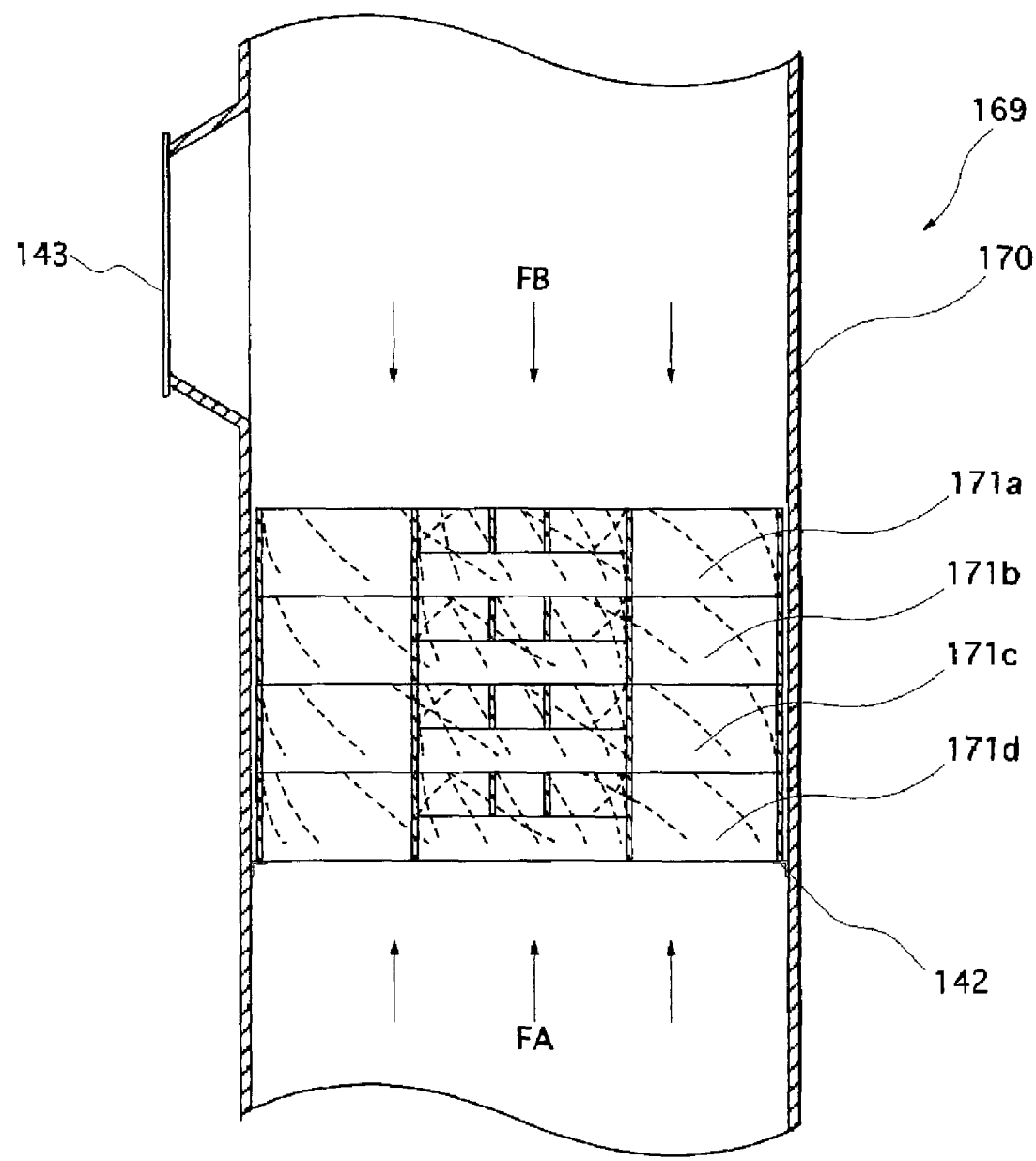
[FIG. 24] A schematic partly-longitudinal sectional view showing an application example when a mixing element according to the present invention is applied to a distillation column method gas-liquid contact apparatus.

Hereinafter, embodiments of the present invention will be explained in detail, referring to the attached drawings. FIG. 1 is a perspective view of a 90° rightward rotation type mixing element according to a first embodiment of the present invention; FIG. 2 is a bottom view of a 90° rightward rotation type mixing element according to the first embodiment; FIG. 3 is a partly-enlarged perspective view of a 90° rightward rotation type mixing element according to a second embodiment; FIG. 4 is a perspective view of a mixing element formed of rightward rotation type first blades and leftward rotation type second blades, according to a third embodiment of the present invention; similarly, FIG. 5 is a perspective view of a leftward rotation type mixing element according to a fourth embodiment; similarly, FIG. 6 is a perspective view of a mixing element formed of leftward rotation type first blades and rightward rotation type second blades, according to a fifth embodiment; FIG. 7 is an explanatory view showing a cross-section in the diameter direction of a rightward rotation type mixing element according to the first embodiment of the present invention; similarly, FIG. 8 is a perspective view of 15° rightward rotation type mixing elements according to a sixth embodiment; FIG. 9 is a perspective view of a mixing element in which four 15° rightward rotation type mixing elements of the sixth embodiment of the present invention are stacked; similarly, FIG. 10 is a perspective view of a mixing element in which three 30° rightward rotation type mixing elements of a seventh embodiment are stacked; similarly, FIG. 11 is a perspective view of a mixing element in which three 60° rightward rotation type mixing elements of an eighth embodiment are stacked; similarly, FIG. 12 is a perspective view of a mixing element in which three 90° rightward rotation type mixing elements of a ninth embodiment are stacked; FIG. 13 is a schematic sectional side view according to a first embodiment of a static fluid mixer using a mixing element of the present invention; FIG. 14 is a schematic partly-sectional side view according to a second embodiment of a static fluid mixer using a mixing element of the present invention; similarly, FIG. 15 is a schematic partly-sectional side view according to a third embodiment of a static fluid mixer; FIG. 16 is a schematic longitudinally-sectional perspective view of the static fluid mixer according to the embodiment of the present invention shown in FIG. 13; FIG. 17 is a schematic partly-longitudinal sectional view showing an application example when a mixing element of the present invention is applied to a distillation column method gas-liquid contact apparatus; and similarly, FIG. 18 is a schematic partly-sectional side view showing an application example when a mixing element of the present invention is applied to an absorption column method gas-liquid contact apparatus. FIG. 19 is a perspective view of a mixing element wherein four mixing elements made of 15° rightward rotation type blades are stacked, according to an embodiment of the present invention. FIG. 20 is a perspective view of a mixing element wherein four mixing elements made of 15° rightward rotation type blades are stacked, according to an embodiment of the present invention. FIG. 21 is a perspective view of components forming a mixing element made of 15° rightward rotation type blades, according to an embodiment of the present invention. FIG. 22 is a perspective view of a mixing element produced using components forming a mixing element made of 15° rightward rotation type blades, according to an embodiment of the present invention. FIG. 23 is a schematic partly-longitudinal sectional view showing an application example when a mixing element according to the present invention is applied to a distillation column method gas-liquid contact apparatus. FIG. 24 is a schematic partly-longitudinal sectional view showing an application example when a mixing element according to the present invention is applied to a distillation column method gas-liquid contact apparatus.

Figure 25:
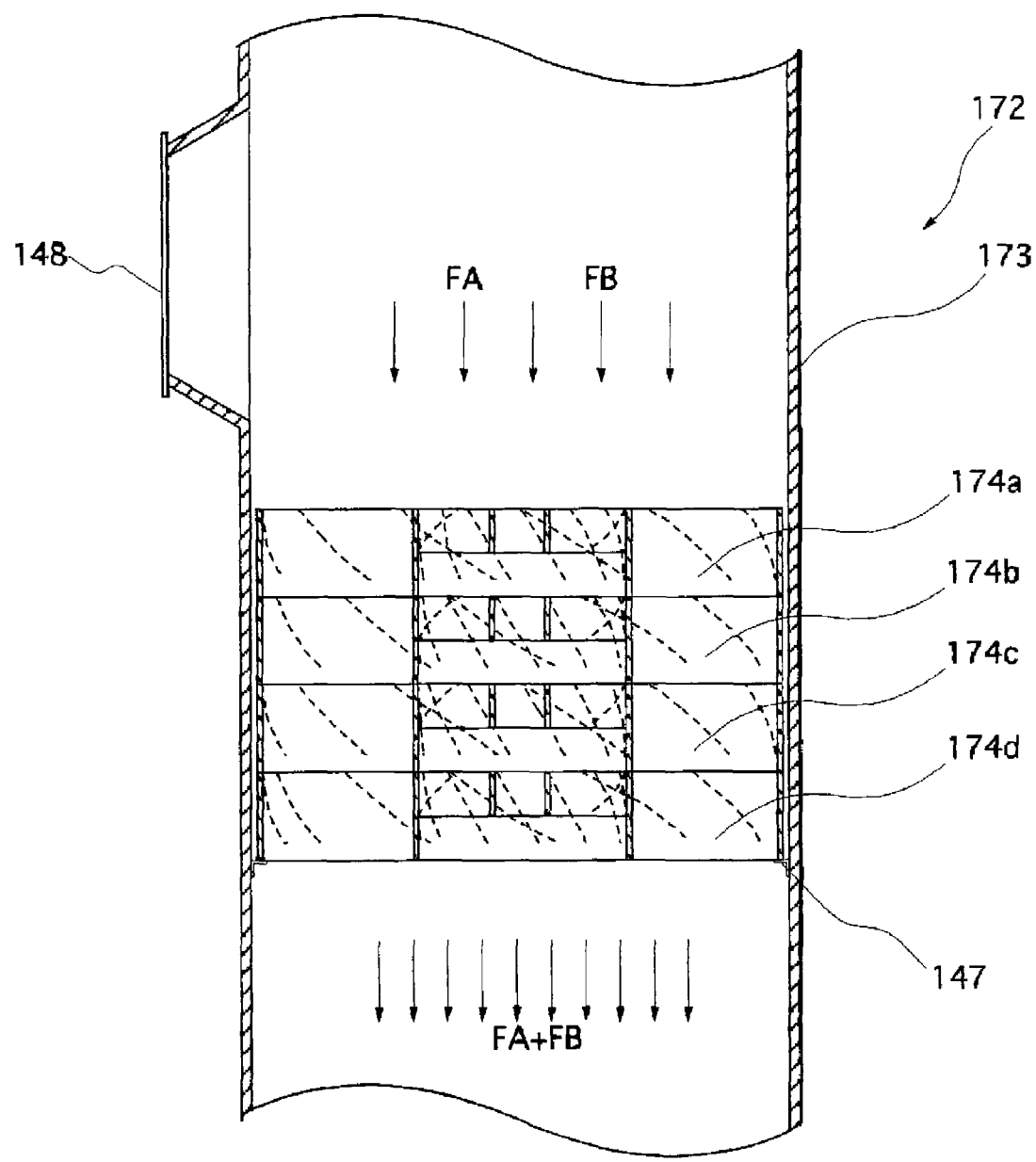
[FIG. 25] A schematic partly-longitudinal sectional view showing an application example when a mixing element according to the present invention is applied to an absorption column method gas-liquid contact apparatus.
Figure 26:
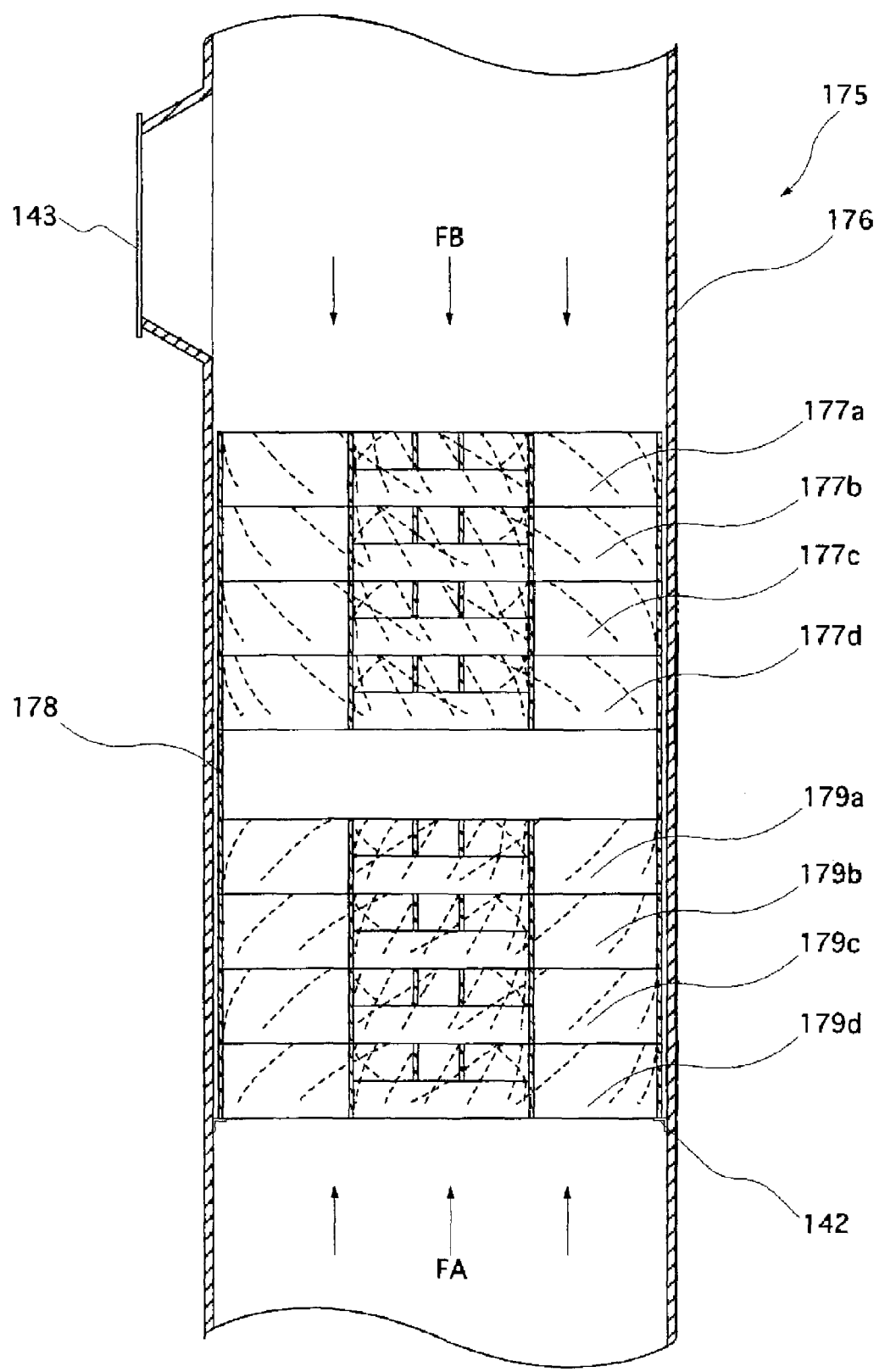
[FIG. 26] A schematic partly-longitudinal sectional view showing an application example when a mixing element according to the present invention is applied to a distillation column method gas-liquid contact apparatus.
Figure 27:
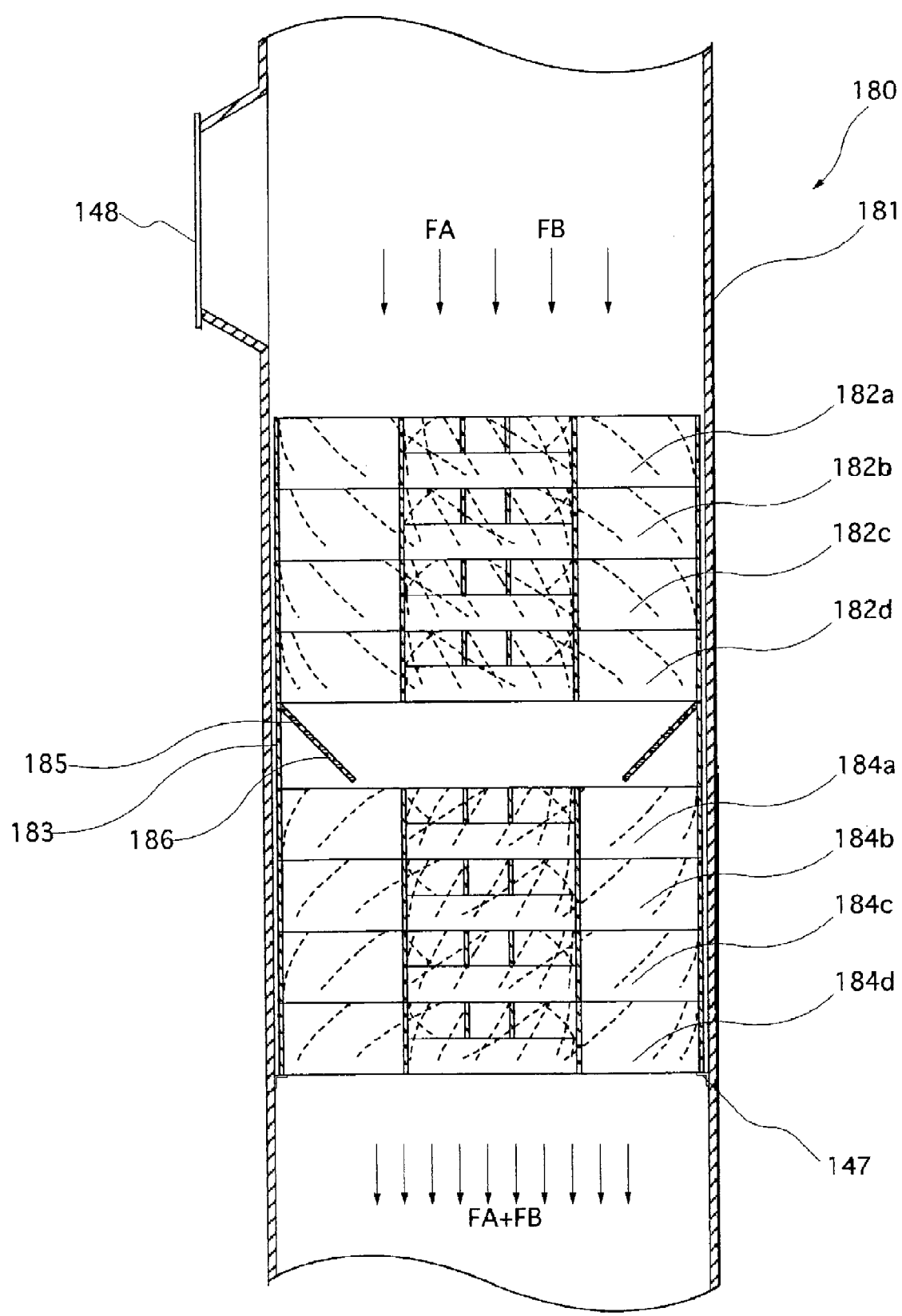
[FIG. 27] A schematic partly-longitudinal sectional view showing an application example when a mixing element according to the present invention is applied to an absorption column method gas-liquid contact apparatus.

FIG. 25 is a schematic partly-longitudinal sectional view showing an application example when a mixing element according to the present invention is applied to an absorption column method gas-liquid contact apparatus. FIG. 26 is a schematic partly-longitudinal sectional view showing an application example when a mixing element according to the present invention is applied to a distillation column method gas-liquid contact apparatus. FIG. 27 is a schematic partly-longitudinal sectional view showing an application example when a mixing element according to the present invention is applied to an absorption column method gas-liquid contact apparatus.

Embodiment 1

FIG. 1 is a perspective view of a 90° rightward rotation type (in the clockwise direction) mixing element showing a first embodiment according to the present invention, and FIG. 2 is a bottom view of the mixing element. A mixing element 1 has a cylindrical passage tube 2, and a plurality of spiral rightward rotation type first blades 3 provided in the passage tube 2. These first blades 3 are formed of a perforated object having a large number of perforations 4. On the inside of the first blades 3 is disposed a first inner cylindrical tube 5 shaped like a cylinder. The first inner cylindrical tube 5 is provided at a connecting portion of the first blades 3 by a necessary length in the axial center direction (in the longitudinal axial center direction), and is not disposed in any other places. In the first inner cylindrical tube 5 are provided a plurality of spiral rightward rotation type second blades 6 formed of a perforated object having a large number of perforations 7. On the inside of the second blades 6 is disposed a second inner cylindrical tube 8 shaped like a cylinder to form an opening 9. The second inner cylindrical tube 8 is provided to enhance mechanical strength against twisting stress of the second blades 6. The second inner cylindrical tube 8 is provided at a connecting portion of the second blades 6 by a necessary length, and is not disposed in any other places. Regarding each of the first blades 3, one end thereof is connected to the outer circumferential surface of the first inner cylindrical tube 5 and becomes spirally twisted in a clockwise direction (rightward rotation) toward the inner circumferential surface of the passage tube 2, with another end thereof being connected to the inner circumferential surface of the passage tube 2. The length of the passage tube 2 in the longitudinal axial center direction is made equal to or slightly greater than the length of the first blades 3.

Similarly, regarding each of the second blades 6, one end thereof is connected to the outer circumferential surface of the second inner cylindrical tube 8 and becomes spirally twisted in a clockwise direction (rightward rotation) toward the inner circumferential surface of the first inner cylindrical tube 5, with another end thereof being connected to the inner circumferential surface of the first inner cylindrical tube 5. Since the second inner cylindrical tube 8 has an opening at its central part, the second blades 6 are not provided in the axial center portion of the second inner cylindrical tube 8, creating a void. Thus as shown in FIGS. 1 and 2, in the axial center portion of the second inner cylindrical tube 8 is formed the opening 9 without blades. In addition, the length of the second blades 6 in the longitudinal axial center direction are made approximately equal to or smaller than that of the first blades 3. It is preferable that the length of the second blades 6 in the longitudinal axial center direction be in the range of approximately 10% to 60% of that of the first blades 3.

Rotation angles (twisting angles) of the blades 3 and 6 are not limited to 90° and are preferably in the range of approximately 5° to 270° in accordance to the internal diameter of the mixing element 1, more preferably in the range of approximately 10° to 180°. Also, it is preferable that the length of the blades 3 and 6 in the axial center direction be in the range of 2.5% to 100% of the diameter of the passage tube 2 and the inner cylindrical tube 5, more preferably in the range of 2.5% to 50%. Further, the number of inner cylindrical tubes disposed is at least one and can accordingly be increased or decreased such as the third, fourth, fifth and n-th inner cylindrical tubes to be disposed, in accordance with the internal diameter of the mixing element 1 such that the diameter of the opening 9 becomes smallest, for example, 50 mm or less. Similarly, not limited to 12 or 6, the number of blades 3 and 6 provided can be increased or decreased accordingly. Regarding the number of second blades 6 provided, the number of second blades 6 can be increased with ease by using the second blades 6 with their rotation angle being 30° or less, for example, hence mixture efficiency can be improved. Also, regarding the production of the blades 6, a plate material can be formed into a spiral shape with ease. Further, regarding the positions in which the blades 3 and 6 are disposed in the radius direction, they are disposed approximately evenly at regular intervals in the passage tube 2 and the inner cylindrical tube 5 and joined to the passage tube 2 and the inner cylindrical tube 5. This makes it possible to obtain homogeneity of fluid mixture. It is preferable that the packing density ($m^2/m^3$) be in the range of 10 $m^2/m^3$ to 300 $m^2/m^3$, for example in the case of the perforated ratio of perforations 4 and 7 of the blades 3 and 6 being 10%, more preferably in the range of 20 $m^2/m^3$ to 180 $m^2/m^3$. It should be noted that not limited to the above range, the packing density is selected and used accordingly, depending upon use conditions of the density, viscosity, interfacial tension, stripping coefficient, volume flow-rate and Reynolds number of fluid, the kind of fluid, and the like. It should be noted that the respective blades 3 and blades 6 may be formed by using perforated plates having other perforated ratios in which perforated ratios of the perforations 4 and 7 of the perforated plate forming the first blades 3 and the second blades 6 are different from each other such that, for example, that of the first blades 3 is around 20% and that of the second blades 6 is around 40%. Also, it is possible to form the blades 3 and the blades 6 in which the perforated ratio of the first blades 3 is made to be around 40% and that of the second blades 6 is made to be around 20%. Further, with respect to the diameter (perforation diameter) of the perforations 4 and 7 of the blades 3 and the blades 6, they may be formed by perforated plates having perforation diameters different from each other in which, for example, the diameter of the first blades 3 is around 20 mm and diameter of the second blades 6 is around 5 mm. Further, it is possible to form the mixing element 1 by disposing many kinds of blades 3 and blades 6 having different perforated ratios and perforation diameters. For example, it is possible to form the mixing element 1 by disposing two kinds of blades 3a and 3b one after the other in which the blades 3a (not shown) has perforated ratio of 10%, perforation diameter of 10 mm and the neighboring blades 3b (not shown) has perforated ratio of 30%, perforation diameter of 30 mm. It is possible to form the blades 6 according to a similar way. As described above, with respect to the mixing element 1 which is formed by disposing many kinds of blades 3 and blades 6 having different perforation diameters or by disposing many kinds of blades 3 and blades 6 having different perforated ratios respectively, it is possible to attempt improvement in turbulence effect by linear velocity turbulence generated locally and advantage in mixing efficiency of fluids by selecting perforation diameters and/or perforated ratios of the blades 3 and 6 respectively. It should be noted with respect to the perforation diameters and the perforated ratios of the blades 3 and the blades 6 that it is not limited by these numeric values and combination thereof and it is possible to properly select and use them according to use conditions. In addition, the mixing element 1 may be formed by joining a flange or the like to both the ends of the passage tube 2.

Embodiment 2

FIG. 3 is a partly-enlarged perspective view of a 90° rightward rotation type mixing element showing a second embodiment according to the present invention.

Similarly to the mixing element 1 shown in FIGS. 1 and 2, a mixing element 10 has a cylindrical passage tube 11 and a plurality of spiral rightward rotation type first blades 12 provided in the passage tube 11. The blades 12 are formed of a perforated object having a large number of perforations 13. On the inside of the blades 12 is disposed a first inner cylindrical tube 14 shaped like a cylinder, and to the outer circumferential portion of the inner cylindrical tube 14 is connected one end of each of the blades 12. The inner cylindrical tube 14 is formed of a perforated object having a large number of perforations 15. In the inner cylindrical tube 14 are provided a plurality of spiral rightward rotation type second blades 16 formed of a perforated object having a large number of perforations 17. On the inside of the blades 16 is disposed a second inner cylindrical tube 18 shaped like a cylinder. The inner cylindrical tube 18 is formed of a perforated object having a large number of perforations 19. The length of the passage tube 11 in the longitudinal axial center direction is made equal to or slightly greater than the length of the first blades 12.

By forming the first inner cylindrical tube 14 and the second inner cylindrical tube 18 of a perforated object having the large number of perforations 15 and 19, the mixture effectiveness and homogeneity of fluids flowing in the axial center direction (in the longitudinal axial center direction) in the mixing element 10 are further improved. The shape of the perforations 15 and 19 is accordingly selected for use from a triangle, square, oval, slit and the like, as the need arises. Each perforated ratio of the perforations 15 and 19 is accordingly selected for use in the range of approximately 5% to 95%, depending upon use conditions. In addition, similarly to the mixing element 1, regarding the positions in which the blades 12 and 16 are disposed in then radius direction, they are disposed approximately evenly at regular intervals and joined to the passage tube 11 and the inner cylindrical tube 14. It should be noted that there is no special limitation in the perforation diameters of the inner cylindrical tube 14 and the inner cylindrical tube 16 and it is properly selected to be in a range from around 2 mm to 50 mm according to the use condition.

Embodiment 3

FIG. 4 is a perspective view of a mixing element showing a third embodiment according to the present invention. A mixing element 20 has a cylindrical passage tube 21 and a plurality of spiral rightward rotation type first blades 22 provided in the passage tube 21. The blades 22 are formed of a perforated object having a large number of perforations 23. On the inside of the blades 22 is disposed a first inner cylindrical tube 24 shaped like a cylinder. In the inner cylindrical tube 24 are provided a plurality of spiral leftward rotation type second blades 25 formed of a perforated object having a large number of perforations 26. On the inside of the blades 25 is disposed a second inner cylindrical tube 27 shaped like a cylinder to form an opening 28. The length of the passage tube 21 in the longitudinal axial center direction is made equal to or slightly greater than the length of the first blades 22.

Specifically, the mixing element 20 incorporates the first blades 22 of rightward rotation (in the clockwise direction) and the second blades 25 of leftward rotation (in the counterclockwise direction) in the passage tube 21. Thus, regarding fluids of rightward rotation and leftward rotation flowing in the mixing element 20, mixture efficiency is further improved, for example, even in the range of 1 m/s to 15 m/s in gas flow rate, because strong shearing stress is generated by swirling currents opposite to each other in the radius direction in the mixing element 20. In addition, by forming the inner cylindrical tubes 24 and 27 of a perforated object, mixture efficiency and homogeneity are further improved.

Embodiment 4

FIG. 5 is a perspective view of a 90° leftward rotation type (in the counterclockwise direction) mixing element showing a fourth embodiment according to the present invention. A mixing element 29 has a cylindrical passage tube 30 and a plurality of spiral leftward rotation type first blades 31 provided in the passage tube 30. The first blades 31 are formed of a perforated object having a large number of perforations 32. On the inside of the first blades 31 is disposed a first inner cylindrical tube 33 shaped like a cylinder. The first inner cylindrical tube 33 is provided at a connecting portion of the first blades 31 by a necessary length in the axial center direction (in the longitudinal axial center direction), and is not disposed in any other places. In the first inner cylindrical tube 33 are provided a plurality of spiral leftward rotation type second blades 34 formed of a perforated object having a large number of perforations 35. On the inside of the second blades 34 is disposed a second inner cylindrical tube 36 shaped like a cylinder to form an opening 37. Similarly to the one mentioned earlier, the second inner cylindrical tube 36 is provided to enhance mechanical strength against twisting stress of the second blades 34. The second inner cylindrical tube 36 is provided at a connecting portion of the second blades 34 by a necessary length according to the need, and is not disposed in any other places. Regarding the first blades 31, one end thereof is connected to the outer circumferential surface of the first inner cylindrical tube 33 and becomes spirally twisted in a counterclockwise direction (leftward rotation) toward the inner circumferential surface of the passage tube 30, with another end thereof being connected to the inner circumferential surface of the passage tube 30. The length of the passage tube 30 in the longitudinal axial center direction is made equal to or slightly greater than the length of the first blades 31.

Similarly, regarding the second blades 34, one end thereof is connected to the outer circumferential surface of the second inner cylindrical tube 36 and becomes spirally twisted in a counterclockwise direction (leftward rotation) toward the inner circumferential surface of the first inner cylindrical tube 33, with another end thereof being connected to the inner circumferential surface of the first inner cylindrical tube 33. Since the second inner cylindrical tube 36 has an opening at its central part, the second blades 34 are not provided in the axial center portion of the second inner cylindrical tube 36 to create a void.

Similarly to the one mentioned earlier, rotation angles (twisting angles) of the blades 31 and 34 are not limited to 90° and are preferably in the range of approximately 5° to 270° in accordance with the internal diameter of the mixing element 29, and more preferably in the range of approximately 10° to 180°. Further, the number of inner cylindrical tubes disposed is at least one and can be accordingly increased or decreased, in accordance with the internal diameter of the mixing element 29. Further, the number of blades 31 and 34 provided is not limited to 12 and 6, and can accordingly be increased or decreased in the range where production is possible, depending upon packing density required.

Embodiment 5

FIG. 6 is a perspective view of a mixing element showing a fifth embodiment according to the present invention. A mixing element 38 has a cylindrical passage tube 39 and a plurality of spiral leftward rotation type first blades 40 provided in the passage tube 39. The blades 40 are formed of a perforated object having a large number of perforations 41. On the inside of the blades 40 is disposed a first inner cylindrical tube 42 shaped like a cylinder. In the inner cylindrical tube 42 are provided a plurality of spiral rightward rotation type second blades 43 formed of a perforated object having a large number of perforations 44. On the inside of the blades 43 is disposed a second inner cylindrical tube 45 shaped like a cylinder to form an opening 46. The length of the passage tube 39 in the longitudinal axial center direction is made equal to or slightly greater than the length of the first blades 40.

Similarly to the one mentioned earlier, the mixing element 38 incorporates the blades 40 of leftward rotation (in the counterclockwise direction) and the blades 43 of rightward rotation (in the clockwise direction) in the passage tube 39. Thus, regarding fluids of rightward rotation and leftward rotation flowing in the mixing element 38, mixture efficiency is further improved, because strong shearing stress is generated by swirling currents opposite to each other in the radius direction in the mixing element 38. In addition, by forming the inner cylindrical tubes 42 and 45 of a perforated object mixture efficiency is further improved.

FIG. 7 is an explanatory view relating to dimensions (lengths) regarding the diameters of a passage tube and an inner cylindrical tube in a mixing element according to the present invention. As described in FIGS. 1, 2 and 3, a mixing element 47 includes a passage tube 48, first blades 49, a first inner cylindrical tube 50, second blades 51 and a second inner cylindrical tube 52 to form an opening 53. Regarding the dimensional ratio of a passage tube to an inner cylindrical tube in the mixing element 47, if the diameter of the passage tube 48 is φD and the diameter of the inner cylindrical tube 50 is φd, it is preferable that φd be in the range of approximately 5% to 95% of φD, more preferably 10% to 60%. Further, it is preferable that the diameter of the opening 53 be small, for example 50 mm or less, and be in the range of approximately 5% to 50% of φD, the diameter φd of the first inner cylindrical tube 50, more preferably in the range of approximately 10% to 30%. In addition, the dimensional ratio of a passage tube to an inner cylindrical tube is accordingly selected for use, in accordance with the dimensions of the passage tube, the easiness of the production and the efficiency of mixture. Further, not limited to first and second inner cylindrical tubes, inner cylindrical tubes can be disposed toward the central part of a passage tube in turn, for example, such as the third, fourth, fifth and n-th inner cylindrical tubes and accordingly selected for use, with a plurality of blades disposed in each inner cylindrical tube in turn in a similar manner. The rotation angle of the second blades 51 is made approximately equal to or smaller than that of the first blades 49. This makes production easier, makes packing density improved and so makes mixture efficiency further improved.

Embodiment 6

FIG. 8 is a perspective view of 15° rightward rotation type (in the clockwise direction) mixing elements showing a sixth embodiment according to the present invention. A mixing element 54a has a cylindrical passage tube 55 and a plurality of spiral rightward rotation type first blades 56 provided in the passage tube 55. The blades 56 are formed of a perforated object having a large number of perforations 57. On the inside of the blades 56 is disposed a first inner cylindrical tube 58 shaped like a cylinder. The inner cylindrical tube 58 is provided at a connecting portion of the first blades 56 by a necessary length in the axial center direction (in the longitudinal axial center direction), and not disposed in any other places. In the inner cylindrical tube 58 are provided a plurality of spiral rightward rotation type second blades 59 formed of a perforated object having a large number of perforations 60. On the inside of the blades 59 is disposed a second inner cylindrical tube 61 shaped like a cylinder to form an opening 62. The inner cylindrical tube 61 is provided to enhance mechanical strength against twisting stress of the blades 59. The second inner cylindrical tube 61 is provided at a connecting portion of the second blades 59 by a necessary length according to the need, and is not disposed in any other places. Regarding the first blades 56, one end thereof is connected to the outer circumferential surface of the first inner cylindrical tube 58 and becomes spirally twisted by approximately 15° in a clockwise direction (rightward rotation) toward the inner circumferential surface of the passage tube 55, with another end thereof being connected to the inner circumferential surface of the passage tube 55. The length of the passage tube 55 in the longitudinal axial center direction is made equal to or slightly greater than the length of the first blades 56.

Similarly, regarding the second blades 59, one end thereof is connected to the outer circumferential surface of the second inner cylindrical tube 61 and becomes spirally twisted in a clockwise direction (rightward rotation) toward the inner circumferential surface of the first inner cylindrical tube 58, with another end thereof being connected to the inner circumferential surface of the first inner cylindrical tube 58. Since the second inner cylindrical tube 61 has an opening at its central part the second blades 59 are not provided in the axial center portion of the second inner cylindrical tube 61 to create a void. Thus, in the axial center portion of the second inner cylindrical tube 61 is formed the opening 62 without the blades. Mixing elements 54b, 54c, 54d are formed similarly to the mixing element 54a.

As regards the mixing elements 54a 54b, 54c and 54d, since the rotation angles of the first blades 56 and the second blades 59 are approximately 15°, production of the blades 56 and 59 is facilitated, and the number of blades 56 and 59 installed can easily be increased, so that packing density increases and mixture efficiency is further improved. Further, production of mixing elements having a large diameter (1000 mm or more in diameter) is facilitated, and also reduction in mold costs and the easiness of production enable production costs to be reduced. Furthermore, replacing the packing used in a distillation column and an absorption column in prior art is possible, so that assembly and installation word of the mixing elements 54a, 54b, 54c and 54d on site and in those columns can be made easy. Regarding a production method of the mixing element 54, each of the passage tube 55, the blades 56, 59, and the inner cylindrical tubes 58, 61 is produced separately. Also, produced with a plurality of members which have been divided in at least two parts in the longitudinal direction, the cylindrical passage tube 55 and the inner cylindrical tubes 58, 61 may be formed by connecting the plurality of members divided. Similarly, the spiral blades 56, 59 may be formed by connecting a plurality of members which have been divided in at least two parts in the longitudinal axial center direction or radius direction. In addition, the mixing elements 54*a*, 54*b*, 54*c* and 54*d* can be produced with ease by connecting the passage tube 55, the inner cylindrical tubes 58, 61, and the blades 56, 59 by means of welding, bonding, adhesion, locking and so forth.

Regarding a mixing element 63 shown in FIG. 9, the above-described four 15° rightward rotation type mixing elements 54*a*, 54*b*, 54*c*, 54*d* are stacked, in other words, the mixing elements 54*a*, 54*b*, 54*c*, 54*d* are disposed in series and connected such that the rotation angle (twisting angle) of the blades 56 becomes approximately 60° in total. Specifically, by connecting edges of adjacent first blades 56, the mixing element 63 having such blades as 15°+15°+15°+15°=60° is formed. In other words, the mixing element 63 having a rotation angle of 60° is easily formed.

By disposing a necessary number of mixing elements 54 on top of the other in this manner, a mixing element having an arbitrary rotation angle such as approximately 180°, approximately 270°, and approximately 360° can be produced with ease.

In addition, not necessarily being connected in a predetermined position, edges of blades 56 next to each other may be disposed in an arbitrary position and used. Further, mixing elements are not limited to rightward rotation type blades, and a combination of the rotation direction of blades forming the mixing elements 10, 20, 29, 38 shown in FIGS. 3 through 6 is accordingly selected for use, according to the need.

Embodiment 7

FIG. 10 is a perspective view of a 30° rightward rotation type (in the clockwise direction) mixing element showing a seventh embodiment according to the present invention. Similarly to the mixing element shown in FIG. 8, a mixing element 64 has a cylindrical passage tube 65 and a plurality of spiral rightward rotation type first blades 66 provided it the passage tube 65. The first blades 66 are formed of a perforated object having a large number of perforations 67. On the inside of the first blades 66 is disposed a first inner cylindrical tube 68 shaped like a cylinder. This inner cylindrical tube 68 is provided at a connecting portion of the blades 66 by a necessary length in the longitudinal axial center direction, and not disposed in any other places. In the inner cylindrical tube 68 are provided a plurality of spiral rightward rotation type second blades 69 formed of a perforated object having a large number of perforations 70. On the inside of the blades 69 is disposed a second inner cylindrical tube 71 shaped like a cylinder to form an opening 72. The inner cylindrical tube 71 is provided to enhance mechanical strength against twisting stress of the blades 69. The inner cylindrical tube 71 is provided at a connecting portion of the blades 69 by a necessary length according to the need, and not disposed in any other places.

The followings are similar to the mixing element shown in FIG. 8 and therefore are not explained in detail.

As regards the mixing element 64 shown in FIG. 10, three approximately 30° rightward rotation type mixing elements 64*a*, 64*b*, 64*c* are stacked and connected such that the rotation angle of the blades 66 becomes approximately 90° in total. Similarly to the mixing element 63 shown in FIG. 9, the mixing element 64 having such blades as 30°+30°+30°=90° is easily formed.

Embodiment 8

FIG. 11 is a perspective view of a 60° rightward rotation type (in the clockwise direction) mixing element showing an eighth embodiment according to the present invention. A mixing element 73 has a cylindrical passage tube 74 and a plurality of spiral rightward rotation type first blades 75 provided in the passage tube 74. The blades 75 are formed of a perforated object having a large number of perforations 76. On the inside of the blades 75 is disposed a first inner cylindrical tube 77 shaped like a cylinder. The inner cylindrical tube 77 is provided at a connecting portion of the blades 75 by a necessary length in the axial center direction (in the longitudinal axial center direction), and not disposed in any other places. In the inner cylindrical tube 77 are provided a plurality of spiral rightward rotation type second blades 78 formed of a perforated object having a large number of perforations 79. On the inside of the blades 78 is disposed a second inner cylindrical tube 80 shaped like a cylinder to form an opening 81. The inner cylindrical tube 80 is provided to enhance mechanical strength against twisting stress of the blades 78. The inner cylindrical tube 80 is provided at a connecting portion of the second blades 78 by a necessary length according to the need, and not disposed in any other places. In addition, the length in the longitudinal axial center direction of the second blades 78 is preferably equal to, or 50% or less than the length of the first blades 75. Specifically it is preferable that at least two second blades 78 are formed per first blade 75.

The followings are similar to the mixing element shown in FIG. 8 and therefore are not explained in detail.

As regards the mixing element 73 shown in FIG. 11, three approximately 60° rightward rotation type mixing elements 73*a*, 73*b*, 73*c* are stacked and connected such that the rotation angle of the blades 75 becomes approximately 180° in total. Similarly to the mixing element 63 shown in FIG. 9, the mixing element 73 having such blades as 60°+60°+60°=180° is easily formed.

Embodiment 9

FIG. 12 is a perspective view of a 90° rightward rotation type (in the clockwise direction) mixing element showing a ninth embodiment according to the present invention. A mixing element 82 has a cylindrical passage tube 83 and a plurality of spiral rightward rotation type first blades 84 provided in the passage tube 83. The blades 84 are formed of a perforated object having a large number of perforations 85. On the inside of the blades 84 is disposed a first inner cylindrical tube 86 shaped like a cylinder. The inner cylindrical tube 86 is provided at a connecting portion of the blades 84 by a necessary length in the axial center direction (in the longitudinal axial direction), and not disposed in any other places. In the inner cylindrical tube 86 are provided a plurality of spiral rightward rotation type second blades 87 formed of a perforated object having a large number of perforations 88. On the inside of the blades 87 is disposed a second inner cylindrical tube 89 shaped like a cylinder to form an opening 90. The inner cylindrical tube 89 is provided to enhance mechanical strength against twisting stress of the blades 87. The inner cylindrical tube 89 is provided at a connecting portion of the blades 87 by a necessary length according to the need, and not disposed in any other places. Note that, similarly to the above Embodiment 8, it is preferable at least two second blades 87 are formed per first blade 84.

The followings are similar to the mixing element shown in FIG. 8 and therefore are not explained in detail.

As regards the mixing element 82 shown in FIG. 12, three approximately 90° rightward rotation type mixing elements 82a, 82b, 82c are stacked and connected such that the rotation angle of the blades 84 becomes approximately 270° in total. Similarly to the mixing element 63 shown in FIG. 9, the mixing element 82 having such blades as 90°+90°+90°=270° is easily formed.

Embodiment 10

FIG. 13 is a schematic sectional side view of a static fluid mixer using mixing elements of the present invention, in which a rightward rotation type mixing element according to a first embodiment and a leftward rotation type mixing element according to a fourth embodiment are connected tandem via a spacer. A cylindrical static fluid mixer 91 is formed by alternately disposing a rightward rotation type mixing element 93 and a leftward rotation type mixing element 94, with a spacer 95 of the same diameter as the mixing elements 93, 94 disposed in between, in a cylindrical casing 92. In addition, two rightward rotation type second blades 98 are disposed all along a rightward rotation type first blade 96. Further, the mixing elements 93, 94 incorporate a first inner cylindrical tube 97 and a second inner cylindrical tube 99 shown in FIGS. 1 and 5, respectively. It is preferable that an opening 100 be small in diameter (50 mm or less in diameter), with a plurality of inner cylindrical tubes and blades provided. Note that, a static fluid mixer may be formed by alternately disposing the mixing elements 93, 94 in the casing 92 without disposing this cylindrical spacer 95. Further, a static fluid mixer may be formed by joining together the edges of the mixing elements 93, 94. In addition, the second blades 98 are approximately half the length of the first blades 96 in the longitudinal axial center direction. Also, the second blades 98 have a predetermined rotation angle, which is smaller than that of the first blades 96. For example, the rotation angle of the second blades 98 is approximately 45° as compared with the rotation angle of the first blades 96 which is approximately 90°.

While two kinds of fluids FA and FB flow in the static fluid mixer 91 constructed as described above, part of the fluids revolves spirally in accordance with the rotation angles of blades, becoming circling currents in the clockwise direction, part of the fluids flows through perforations in blades and then is sheared, and part of the fluids flows through perforations in an inner cylindrical tube and then is sheared, and accordingly these fluids flow together, and further, are turned over and divided. The two kinds of fluids FA and FB are mixed in a homogeneous manner as revolution, passing, shearing, convergence, turnover and division are continuously repeated in this manner.

Embodiment 11

FIG. 14 is a schematic partly-sectional side view of a static fluid mixer using a mixing element of the present invention, in which at least one rightward rotation type mixing element according to a second embodiment shown in FIG. 3 is provided. A cylindrical static fluid mixer 101 is formed by disposing a rightward rotation type mixing element 103 and a cylindrical spacer 110 having the same diameter as the mixing element 103 in a cylindrical casing 102. Rightward rotation type first blades 104 provided in this mixing element 103 are similar to the mixing element 93 shown in FIG. 13, whereas two rightward rotation type second blades 106 are disposed at a necessary portion in the axial center direction (in the longitudinal axial center direction) in a first inner cylindrical tube 105 with a space portion 109 disposed in between, and an opening 108 is formed to constitute the mixing element 103. By forming the space portion 109, where no second blade 106 is provided, in the first inner cylindrical tube 105 in this manner, mixture efficiency can be improved with the effectiveness of fluids converged to flow together in the radius direction. It should be noted that, second blades 106 not necessarily being a rightward rotation type, rightward and leftward rotation type second blades 106 may be placed alternately to form a static fluid mixer 101.

Embodiment 12

FIG. 15 is a schematic partly-sectional side view of a static fluid mixer using a mixing element of the present invention, in which at least one rightward rotation type mixing element according to a third embodiment shown in FIG. 4 is provided. A cylindrical static fluid mixer 111 is formed by disposing a rightward rotation type mixing element 113 and a cylindrical spacer 120 having the same diameter as the mixing element 113 in a cylindrical casing 112. Rightward rotation type first blades 114 provided in the mixing element 113 are similar to the mixing element 93 shown in FIG. 13, whereas second blades 116 provided in a first inner cylindrical tube 115 are formed of the leftward rotation type. Further similarly to the mixing element 103 shown in FIG. 14, with a space portion 119 provided in between, two leftward rotation type second blades 116 are disposed to form the mixing element 113. Further, similarly to FIG. 13, a second inner cylindrical tube 117 and an opening 118 are formed. In addition, the rotation angle of the second blades 116 is made smaller than that of the first blades 114.

Regarding the static fluid mixer 111 constructed in this manner, mixture efficiency is further improved with the occurrence of circling currents of rightward rotation and leftward rotation which are opposed to each other. It should be noted that, second blades 116 not necessarily being a leftward rotation type, leftward and rightward rotation type second blades 116 may be placed alternately to form a static fluid mixer 111.

FIG. 16 is a longitudinally-sectional schematic perspective view, in the axial center direction (in the longitudinal axial center direction), of the static fluid mixer according to an embodiment of the present invention shown in FIG. 13. A cylindrical static fluid mixer 121 is formed by alternately disposing a cylindrical rightward rotation type mixing element 122 and a cylindrical leftward rotation type mixing element 123, with a cylindrical spacer 124 in between.

The rightward rotation type mixing element 122 has a cylindrical passage tube 125 and a plurality of spiral rightward rotation type first blades 126 provided in the passage tube 125. The blades 126 are formed of a perforated object having a large number of perforations 127. On the inside of the blades 126 (at the central part), a first inner cylindrical tube 128 having perforations, shaped like a cylinder, is disposed all along the length of first blades 126. In the inner cylindrical tube 128 are provided a plurality of spiral rightward rotation type second blades 129 formed of a perforated object having a large number of perforations 130. On the inside of the blades 129 (at the central part) having a predetermined rotation angle is disposed a second inner cylindrical tube 131 shaped like a cylinder to form an opening 133.

Similarly to the first inner cylindrical tube 128, the inner cylindrical tube 131 is provided with a large number of perforations 132. One end of the cylindrical spacer 124 which has the same diameter as the mixing element 122 is joined to an edge of the mixing element 122. It is preferable that the length in the axial center direction (in the longitudinal axial center direction) of the spacer 124 be 0.1 to 10 times the whole length of the mixing element 122. It is more preferable that the range be 0.2 to 5 times the whole length thereof. Note that, not limited to a cylinder with an equal diameter, the cross-section of the spacer 124 in the axial center direction may be a cone shape. This makes fluid flowing through an inner wall portion of the passage tube 125 move toward the central part.

One end of the leftward rotation type mixing element 123 is joined to the other end of the spacer 124. The leftward rotation type mixing element 123, whose detailed explanation is omitted, has a cylindrical passage tube 134 and a plurality of spiral leftward rotation type first blades 135 provided in the passage tube 134, similarly to the above-described rightward rotation type mixing element 122. The blades 135 are formed of a perforated object having a large number of perforations 136. On the inside of the blades 135 (at the central part) having a predetermined rotation angle, a first inner cylindrical tube 137 having perforations, shaped like a cylinder, is disposed all along the length of the first blades 135, similarly to FIG. 3. In the inner cylindrical tube 137 are provided a plurality of spiral leftward rotation type second blades 138 formed of a perforated object having a large number of perforations. On the inside of the blades 138 (at the central part) is disposed a second inner cylindrical tube shaped like a cylinder to form an opening 133. Similarly to the first inner cylindrical tube 137, the inner cylindrical tube is provided with a large number of perforations. The other end of the leftward rotation type mixing element 123 is joined to a spacer 124 as described above, and further is joined to a rightward rotation type mixing element 122 as described above with this spacer 124 disposed in between, to form the static fluid mixer 121. The static fluid mixer 121 includes two rightward rotation type mixing elements 122 and one leftward rotation type mixing element 123; however, not limited thereto, a static fluid mixer may be formed by using at least one mixing element of the above-described type. The number of the above described mixing elements disposed, rotation angles, rotation directions, and the number of blades disposed are accordingly selected and used depending upon the purpose and conditions when used.

Embodiment 13

FIG. 17 is a schematic partly-longitudinally-sectional view showing an application example when a mixing element according to an embodiment of the present invention is applied to a distillation column method gas-liquid contact apparatus. A distillation column 139 has a cylindrical casing 140 and four rightward rotation type mixing elements 141a, 141b, 141c, 141d disposed in the casing 140. The mixing elements 141a, 141b, 141c, 141d are locked in a predetermined position by means of a mixing element supporting mold 142 provided in the casing 140. A manway 143 is formed with such a structure and dimensions as allow members of the mixing element 141 and workers to be carried into and out of the casing 140. It should be noted that rightward and leftward rotation type mixing elements may alternately be placed tandem (not shown in the figures) to form a high-efficiency distillation column 139. Also, the manway 143 is accordingly selected and provided, depending upon the need.

In the distillation column 139 thus constructed, an ascending gas (FA) and a descending liquid (FB) in the distillation column 139 flow as countercurrents in the mixing element 141, allowing the gas and the liquid to be agitated and mixed, and so the gas and liquid are sufficiently contacted. By applying this distillation column 139 which prevents channeling and does not require a liquid redistribution apparatus to flash distillation, steam distillation and so forth, foreign bodies in liquid can be separated, refined and collected.

By using a mixing element according to the present invention as packing in a distillation column, treatment with a gas velocity in the distillation column which is 1.5 to 5 times the velocity of a distillation column in related art is made possible, so that the column diameter becomes small and equipment costs can be reduced. Further, with the improvement in packing density, the gas-liquid effective contact area is improved, the height of the column decreases and operation with low pressure loss is made possible, which lowers the amount of steam, gas and the like supplied, for example. Further, operational management is made easy because of a wide operation control range against the fluctuation of a liquid-gas ratio. Furthermore, by replacing packing used in a distillation column of related art with a mixing element of the present invention, productivity and maintenance can be improved with ease. Replacing work and installation work with respect to a mixing element of the present invention are made easily possible via a manway of a distillation column already installed. Further, in comparison with a distillation column using a conventional static mixer, the diameter of an opening of a mixing element of the present invention can be made smallest (for example, 50 mm or less), so that packing density improves, a short circuit of fluid in the opening less occurs, and gas-liquid contact efficiency further improves. Also, by making the rotation angle of blades small (for example, 15° or less), production of a mixing element of the present invention is facilitated to enable a mixing element of the present invention to be provided and installed in a small distillation column. Moreover, production of a distillation column of a large diameter (1 m or more in diameter) is facilitated, enabling large-capacity treatment. Further, clogging caused by the accretionary growth of generated solid matter and the like is prevented, and so maintenance costs are reduced. Note that a distillation column method gas-liquid contact apparatus according to the present invention can also be used as a stripping column method gas-liquid contact apparatus. For example, a distillation column method gas-liquid contact apparatus according to the present invention can be applied to removal by stripping of ammonia ($NH_4^+$) in liquid, removal by stripping of organic chlorine-based compounds such as volatile substances of trichloroethane, methylene chloride and the like in liquid, and removal by stripping of oxygen, carbon dioxide, krypton, xenon, radon and the like dissolved in liquid. A stripping method of those dissolved gases is performed, using a vacuum degassing method, a nitrogen degassing method or the like. Accordingly, a gas-liquid contact apparatus according to the present invention can also be used as a stripping column method gas-liquid contact apparatus.

Embodiment 14

FIG. 18 is a schematic partly-longitudinally-sectional view showing an application example when as mixing element according to an embodiment of the present invention is applied to an absorption column method gas-liquid contact apparatus. An absorption column 144 has a cylindrical casing 145 and four rightward rotation type mixing elements 146a, 146b, 146c, 146d stacked in the casing 145. The mixing elements 146a, 146b, 146c, 146d are locked in a predetermined position by means of a mixing element supporting mold 147 provided in the casing 145. A manway 148 is formed with such a structure and dimensions as allow members of the mixing element 146 to be carried into and out of the casing 145 and workers to go into and out of the casing 145. Similarly to the above-described distillation column, rightward and leftward rotation type mixing elements may alternately be placed tandem (not shown in the figures) to form an absorption column 144. Also, at least one rightward rotation type and one leftward rotation type mixing elements may be placed alternately to form an absorption column 144.

In the absorption column 144 thus constructed, a descending gas (FA) and a descending liquid (FB) it the absorption column 144 flow concurrently in the mixing element 146, allowing the gas and the liquid to be agitated and mixed, and so gas and liquid are sufficiently contacted. Being applied to gas absorption, gas cooling, dust removing operation and the like, the absorption column 144 can be used for the separation, refinement, collection and exclusion of foreign bodies in the gas.

In the case where a mixing element according to the present invention is applied as packing to an absorption column, since neither flooding nor channeling occurs, gas absorption treatment with a gas velocity in the absorption column being 5 to 15 times the velocity of a packed column method in related art is made possible, and so equipment costs can be reduced. Further, with improvement in packing density, gas-liquid contact efficiency improves, the height of the column decreases by 10% to 50%, and the diameter of the column also decreases to be ⅓ to ½, so that operation with a low pressure loss of 200 Pa to 1000 Pa is made possible. Operation with a low liquid-gas ratio (l/m$^3$), for example in the range of 2 l/m$^3$ to 8 l/m$^3$, is made possible. Also, highly efficient gas absorption is made possible with a low gas flow velocity in a low column, for example in the range of 1 m/s to 6 m/s, thus enabling less work space and less energy consumption to be obtained. Further, operational management is made easy because of a wide operation control range against the fluctuation of the amount and concentration of gas treated, and the like. Furthermore, replacing the packing used in an absorption column in related art makes productivity improved with ease. Replacing the packing of related art is made easily possible via a manway. Further, in comparison with an absorption column using a conventional static mixer, an opening of a mixing element, namely, the sectional area of an inner cylindrical tube, can be made smallest, so that a short circuit of fluid in the opening less occurs, and gas-liquid contact efficiency can be improved. Also, production of a mixing element of a large diameter (1 m or more in diameter) is facilitated, an absorption column of a large diameter (1 m or more in diameter) can be easily produced, and so the manufacturing cost of a high-efficiency absorption column which treats large wind amounts (100000 Nm$^3$/h or more) can be lowered. Further, since there is no dead space for fluid, clogging caused by the growth of generated solid matter accreted and the like is prevented, and continuous operation is possible for a long period of time without maintenance.

Embodiment 11

Similarly to the mixing element 63 shown in the above-described FIG. 9, a mixing element 149 shown in FIG. 19 is formed by stacking four 15° rightward rotation type mixing elements 54a, 54b, 54c, 54d. First blades 150 and 151 of the mixing elements 54a and 54b are disposed at predetermined positions, approximately dividing the inner circumference of a passage tube 152 into twelve equal parts (for example, 0°, 30°, 60°, 90°, 120°, 150°, 180°, 210°, 240°, 270°, 300°, 330°). Also, first blades of the mixing elements 54c and 54d are similarly disposed at predetermined positions. Regarding the mixing element 149 thus formed, the number of dividing fluid in the radius direction is four times greater than the above-described mixing element 63, and so gas-liquid contact efficiency is further improved. It should be noted that not limited to twelve, the number of first blades may be accordingly increased or decreased for use, depending upon the need.

Embodiment 12

Similarly to the above-described FIG. 9, a mixing element 153 shown in FIG. 20 is formed by stacking four 15° rightward rotation type mixing elements 154a, 154b, 154c, 154d. A space portion 157 is formed between a lower edge portion of first blades 155 of the mixing element 154a and an upper edge portion of first blades 156 of the mixing element 154b. In other words, edge portions of first blades adjacent to each other form a space.

By thus forming a space portion between first blades of the mixing element 153 adjacent to each other, convergence of fluid in the radius direction is caused to make gas-liquid contact efficiency improved.

Embodiment 13

FIG. 21 is a perspective view of a passage tube, first blades, a first inner cylindrical tube, second blades and a second inner cylindrical tube before assembly, constituting a 15° rightward rotation type mixing element shown in the above-described FIG. 9.

Specifically, the above mixing element includes: three divided passage tubes 158a, 158b, 158c, twelve first blades 159a to 159l, and a set of mixing element 163 having a first inner cylindrical tube 160, six rightward rotation type second blades 161 and a second inner cylindrical tube 162 before assembly. It should be noted that components of a mixing element such as first blades, a first inner cylindrical tube, second blades and a second inner cylindrical tube may be divided into several parts in the vertical and horizontal directions if necessary. Also, not limited to three, the number of passage tube 158 divided is accordingly increased or decreased and selected for use, depending upon the need.

Embodiment 14

FIG. 22 is a perspective view of a mixing element 164 produced, using the components shown in FIG. 21. When producing the mixing element 164, first, divided surfaces 165a, 165b, 165c of the three divided passage tubes 158a, 158b, 158c are joined to each other by means of welding or the like. Next, an outer edge portion of the twelve first blades 159 is joined to a predetermined position on the inner circumferential surface of the passage tube 158 by means of welding or the like. Further, an inner edge portion of the first blades 159 is joined to a predetermined position on the outer circumferential surface of the first inner cylindrical tube 160 forming the above-described one set of mixing element 163 placed at a predetermined position, by means of welding or the like.

With such production method, arrangement of the mixing element 164 in columns such as a distillation column and an absorption column already installed is made easy, and high-efficiency gas-liquid contact and improvement in productivity can be obtained easily. Also, production of a mixing element 164 of a large diameter (1 m or more in diameter) is made easy. Moreover, difficulty in transporting a mixing element of a large diameter (3 m or more in diameter) by land can be solved.

APPLICATION EXAMPLE 3

FIG. 23 is a schematic partly-longitudinal-sectional view showing an application example when a mixing element according to an embodiment of the present invention is applied to a distillation column method gas-liquid contact apparatus. A distillation column 166 includes: a cylindrical casing 167 and four rightward rotation type mixing elements 168a, 168b, 168c, 168d stacked in this casing 167. First blades of the mixing elements 168 are disposed at predetermined positions as shown in the above-described FIG. 19 to form the distillation column 166. The contact efficiency of fluids FA and FB is improved by increasing the division number by the first blades. Detailed explanations will be omitted because of a similarity to those of the distillation column 139 shown in the above-described FIG. 17.

APPLICATION EXAMPLE 4

FIG. 24 is a schematic partly-longitudinal-sectional view showing an application example when a mixing element according to an embodiment of the present invention is applied to a distillation column method gas-liquid contact apparatus. A distillation column 169 includes: a cylindrical casing 170 and four rightward rotation type mixing elements 171a, 171b, 171c, 171d stacked in this casing 170. First blades of the mixing elements 171 are formed in a similar manner to the first blades shown in the above-described FIGS. 19 and 20. The contact efficiency of fluids FA and FB is improved by the increase in dividing number and in convergence in the radius direction by the first blades. Detailed explanations will be omitted because of a similarity to those of the distillation column 139 shown in the above-described FIG. 17.

APPLICATION EXAMPLE 5

FIG. 25 is a schematic partly-longitudinal-sectional view showing an application example when a mixing element according to an embodiment of the present invention is applied to an absorption column method gas-liquid contact apparatus. An absorption column 172 includes: a cylindrical casing 173 and four rightward rotation type mixing elements 174a, 174b, 174c, 174d stacked in this casing 173. First blades of the mixing elements 174 are formed in a similar manner to the first blades shown in the above-described FIGS. 19 and 20. The contact efficiency of fluids FA and FB is improved by the increase in dividing number and in convergence in the radius direction by the first blades. Detailed explanations will be omitted because of a similarity to those of the distillation column 144 shown in the above-described FIG. 18.

APPLICATION EXAMPLE 6

FIG. 26 is a schematic partly-longitudinal-sectional view showing an application example when a mixing element according to an embodiment of the present invention is applied to a distillation column method gas-liquid contact apparatus. A distillation column 175 includes: a cylindrical casing 176; rightward rotation type mixing elements 177a, 177b, 177c, 177d and leftward rotation type mixing elements 179a, 179b, 179c, 179d, with a spacer 178 placed in between, disposed in this casing 176. The spacer 178 is formed of a cylindrical pipe having the same diameter as the mixing elements 177 and 179 and having a predetermined length. First blades of the mixing elements 177 and 179 are formed in a similar manner to the first blades shown in the above-described FIGS. 19 and 20. By placing the spacer 178 between the mixing elements 177 and 179 in this manner, convergence and rectification of fluid in the radius direction are facilitated, and so gas-liquid contact efficiency improves. It should be noted that the mixing element can be applied to an absorption column method gas-liquid contact apparatus in which fluids FA and FB flow concurrently in a similar manner to the above-described absorption columns 144 and 172.

FIG. 27 is a schematic partly-longitudinal-sectional view showing an application example when a mixing element according to an embodiment of the present invention is applied to an absorption column method gas-liquid contact apparatus. An absorption column 180 includes: a cylindrical casing 181; rightward rotation type mixing elements 182a, 182b, 182c, 182d and leftward rotation type mixing elements 184a, 184b, 184c, 184d, with a spacer 183 placed in between, disposed in this casing 181. First blades of the mixing elements 182 and 184 are formed in a similar manner to the first blades shown in the above-described FIGS. 19 and 20. In the spacer 183 is formed a perforated board 185 with a large number of perforations, which is shaped like a cone whose top has been cut off, to bring fluids FA and FB together in the direction of the central part of the absorption column 180. The perforated board 185 has a large number of perforations 186. By placing the spacer 183 with this perforated board 185 in a predetermined position, uneven distribution of fluid (uneven distribution in flowing density) in the radius direction, generated by speeding up the flow of the fluids FA and FB in the column (for example, 5 m/s to 20 m/s in gas superficial velocity), is prevented, and further, there is no dead space for fluid, thereby further improving gas-liquid contact efficiency. It should be noted that the number of mixing elements 182, 184 and spacers 183 installed, the number of perforated boards 185 installed, the shape, installation method and installation angle of the perforated board(s) 185, and the perforation ratio of the perforations 186 can be accordingly selected. Further, note that the above mixing element can be applied to a distillation column method gas-liquid contact apparatus and a stripping column method gas-liquid contact apparatus by making the fluids FA and FB flow as countercurrents. Furthermore, not limited to the above-described application examples in which mixing elements according to the present invention are disposed in the above-described casings, the present invention can be applied to the above distillation column method, stripping column method and absorption column method gas-liquid contact apparatuses without using the above casings, by joining edges of the above-described rightward rotation type and leftward rotation type mixing elements and the above-described spacers adjacent to each other by means of welding, bonding or the like.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A mixing element comprising:
   a cylindrical passage tube through which fluid flows;
   spiral first blades of rightward rotation and leftward rotation provided in said passage tube;
   a first inner cylindrical tube disposed in the axial center portion of said first blades;
   spiral second blades of rightward rotation and leftward rotation provided in said first inner cylindrical tube; and
   a second inner cylindrical tube disposed in the axial center portion of said second blades; wherein
   said first blades and said second blades are formed of a perforated object or a porous object.

2. A mixing element according to claim 1, wherein said passage tube is shaped like cylinder.

3. A mixing element according to claim 1, wherein said first and second inner cylindrical tubes are formed of a perforated object or a porous object.

4. A mixing element according to claim 1, wherein the length of said passage tube in the axial center direction is equal to or slightly greater than the length of said first blades.

5. A mixing element according to claim 1, wherein the rotation angle of said first blades is in the range of approximately 5° to 270°.

6. A mixing element according to claims 1, wherein the rotation angle of said second blades is in the range of approximately 5° to 180°.

7. A mixing element according to claim 1, wherein said first inner cylindrical tube is disposed along all or part of the length of said first blades in the axial center direction thereof.

8. A mixing element according to claim 1, wherein said second inner cylindrical tube is disposed along all or part of the length of said second blades in the axial center direction thereof.

9. A mixing element according to claim 1, wherein the surface area of said first and second blades in total per unit volume in said passage tube is in the range of $10\ m^2/m^3$ to $300\ m^2/m^3$.

10. A mixing element according to claim 1, wherein at least two said second blades are formed per said first blade.

11. A mixing element according to claim 10, wherein a space portion is formed between the second blades, with respect to said at least two second blades.

12. A mixing element according to claim 1, wherein said second inner cylindrical tube has an opening in the axial center portion thereof.

13. A mixing element according to claim 1, wherein said mixing element is formed of rightward rotation type first blades and leftward rotation type second blades.

14. A mixing element according to claim 1, wherein said mixing element is formed of leftward rotation type first blades and rightward rotation type second blades.

15. A mixing element according to claim 1, wherein four of said mixing elements of approximately 15° rightward rotation or leftward rotation are joined together to obtain said mixing element having a rotation angle of approximately 60°.

16. A mixing element according to claim 1, wherein three of said mixing elements of approximately 30° rightward rotation or leftward rotation are joined together to obtain said mixing element having a rotation angle of approximately 90°.

17. A mixing element according to claim 1, wherein three of said mixing elements of approximately 60° rightward rotation or leftward rotation are joined together to obtain said mixing element having a rotation angle of approximately 180°.

18. A mixing element according to claim 1, wherein three of said mixing elements of approximately 90° rightward rotation or leftward rotation are joined together to obtain said mixing element having a rotation angle of approximately 270°.

19. A static fluid mixer comprising: one or more said mixing elements according to any one of claims 1 to 18.

20. A static fluid mixer according to claim 19, wherein said mixing elements of rightward rotation and leftward rotation are alternately disposed in a cylindrical casing with spacers in between.

21. A gas-liquid contact apparatus having:
   a distillation column method gas-liquid contact apparatus through which fluids flow as countercurrents; and
   a mixing element disposed on said distillation column method gas-liquid contact apparatus, said mixing element comprising:
      a cylindrical passage tube through which fluid flows;
      spiral first blades of rightward rotation and leftward rotation provided in said passage tube;
      a first inner cylindrical tube disposed in the axial center portion of said first blades;
      spiral second blades of rightward rotation and leftward rotation provided in said first inner cylindrical tube; and
      a second inner cylindrical tube disposed in the axial center portion of said second blades,
   wherein,
   said first blades and said second blades are formed of a perforated object or a porous object.

22. A gas-liquid contact apparatus comprising:
   a stripping column method gas-liquid contact apparatus through which fluids flow as countercurrents; and
   a mixing element disposed on said stripping column method gas-liquid contact apparatus, said mixing element comprising:
      a cylindrical passage tube through which fluid flows;
      spiral first blades of rightward rotation and leftward rotation provided in said passage tube;
      a first inner cylindrical tube disposed in the axial center portion of said first blades;
      spiral second blades of rightward rotation and leftward rotation provided in said first inner cylindrical tube; and
      a second inner cylindrical tube disposed in the axial center portion of said second blades,
   wherein,
   said first blades and said second blades are formed of a perforated object or a porous object.

23. A gas-liquid contact apparatus comprising:
   an absorption column method gas-liquid contact apparatus through which fluids flow concurrently; and
   a mixing element disposed on said absorption column method gas-liquid contact apparatus, said mixing element comprising:
      a cylindrical passage tube through which fluid flows;
      spiral first blades of rightward rotation and leftward rotation provided in said passage tube;
      a first inner cylindrical tube disposed in the axial center portion of said first blades;

spiral second blades of rightward rotation and leftward rotation provided in said first inner cylindrical tube; and a second inner cylindrical tube disposed in the axial center portion of said second blades, wherein, said first blades and said second blades are formed of a perforated object or a porous object.

24. A gas-liquid contact apparatus according to any one of claims 21 to 23, wherein one or more spacers, in which a perforated board shaped like a cone whose top has been cut off is provided, are disposed in said gas-liquid contact apparatus.

* * * * *